United States Patent [19]
Simionescu et al.

[11] Patent Number: 6,141,728
[45] Date of Patent: Oct. 31, 2000

[54] EMBEDDED CACHE MANAGER

[75] Inventors: Horia Cristian Simionescu, Foster City; Luan Kha Bui, Fremont, both of Calif.; James A. Henson, Bend, Oreg.; Clifford M. Gold, Fremont, Calif.

[73] Assignee: Quantum Corporation, Milpitas, Calif.

[21] Appl. No.: 09/327,293

[22] Filed: Jun. 7, 1999

Related U.S. Application Data

[63] Continuation-in-part of application No. 08/940,074, Sep. 29, 1997, abandoned.

[51] Int. Cl.[7] .................................................. G06F 12/12
[52] U.S. Cl. ................................................................ 711/113
[58] Field of Search ..................................... 711/112, 113, 711/118, 133

[56] References Cited

U.S. PATENT DOCUMENTS

| | | | |
|---|---|---|---|
| 5,005,089 | 4/1991 | Thanos et al. ........................ | 395/77.08 |
| 5,204,963 | 4/1993 | Noya et al. ............................... | 395/750 |
| 5,247,653 | 9/1993 | Hung ....................................... | 395/500 |
| 5,283,875 | 2/1994 | Gibson et al. ............................ | 395/400 |
| 5,317,713 | 5/1994 | Glassburn ................................ | 395/425 |
| 5,465,343 | 11/1995 | Henson et al. .......................... | 395/439 |
| 5,603,002 | 2/1997 | Hashimoto ............................... | 395/440 |
| 5,680,570 | 10/1997 | Rantala et al. .......................... | 395/440 |
| 5,696,931 | 12/1997 | Lum et al. ............................... | 395/440 |
| 5,701,450 | 12/1997 | Duncan .................................... | 395/595 |
| 5,754,889 | 5/1998 | Packer ..................................... | 395/876 |
| 5,768,617 | 6/1998 | Liu .......................................... | 395/825 |
| 5,890,213 | 3/1999 | Sokolov .................................. | 711/113 |

*Primary Examiner*—Eddie P. Chan
*Assistant Examiner*—Kevin L. Ellis
*Attorney, Agent, or Firm*—Michael Zarrabian

[57] ABSTRACT

A method for managing data blocks in a cache buffer defining date block segments, and for automatically transferring data into and out of the cache buffer. A cache list comprises a plurality of entries each including information identifying a corresponding cache segment, and a set of consecutive data blocks stored in the cache segment. Providing cache status for a requested set of date blocks includes traversing the cache list to locate entries identifying the starting data block in the requested set, and consecutive data blocks successively following the starting data block without interruption, and identifying as a missing data block the first data block in said succession, including said starting data block, not identified in any entry. The missing data block is used to provide status: a full hit if the missing data block is not in the requested set; a miss if the missing data block is the starting data block in the requested set, or a partial hit otherwise. In response to a write command for a new set of data, the cache list is traversed to locate all entries identifying sets of data blocks overlapping the new set. If a located entry identifies a set of data blocks fully overlapping the new set, there is a full hit. If no entry is located, there is miss. Otherwise, there is a partial hit. The new set can be automatically transferred into a predesignated buffer area selected by the cache manager.

68 Claims, 30 Drawing Sheets

| XFER MODE | > | + | – | CHK= | |
|---|---|---|---|---|---|
| GET ENTRY 632 | | | | | get invalid |
| CHKENTRY1 646 | SRCH >=ES | EE = ES+EVALID | T1 = –SRCH | | get hit1 |
| CHKENTRY2 648 | EE > SRCH | NUMFOUND = EE – SRCH | T1 = –ES | | get hit2 |
| HIT1 621 | | T1 = SRCH–ES | | | SCRCHLBA = EE, ENTRADDR = 0 |
| ACT1 656 | sideA = T1 < ESIZE | T1 = T1 + OFFSET | T2 = –ESIZE | | |
| ACT2 658 | | T1 = T1–ESIZE?!A? RCNT = T1–ESIZE (!A?FF) | | | HnsBfrptr rollover for hardsegment ? |
| ACT3 660 | | HBptr = T1 + EBPTR | RCNT = –RCNT | | |
| ACT4 662 | HBptr < Highbptro | HBptr = HBptr – Bsizeo | | | HBptr rollover in Buffer ? |

FIG. 20

| | | A WS>ES | WS≥EE | WE>ES | B WE>EE | C WS=WS | D WE=EE |
|---|---|---|---|---|---|---|---|
| I | WS  EE, WR/ENTRY, ES  EE | 0 | 0 | 1 | 0 | 0 | 0 |
| J | WR/ENTRY | 1 | 0 | 1 | 1 | 0 | 0 |
| K | WR/E | 0 | 0 | 1 | 1 | 0 | 0 |
| L | WR/E | 0 | 0 | 1 | 1 | 1 | 0 |
| M | WR/E | 0 | 0 | 1 | 0 | 0 | 1 |
| N | WR/E | 1 | 0 | 1 | 0 | 0 | 0 |
| O | WR/E | 0 | 0 | 1 | 0 | 1 | 0 |
| P | WR/E | 1 | 0 | 1 | 0 | 0 | 1 |
| Q | WR/E | 0 | 0 | 1 | 0 | 1 | 1 |
| No Overlap | E/WR | 1 | 1 | | | | |
| | WR/E | 0 | 0 | | | | |

FIG. 24

| WR LBA SCAN 702 | > | + | − | CHK= | |
|---|---|---|---|---|---|
| GET ENTRY 710 | | | | | get invalid |
| CHKENTRY1 712 | WE > ES cmp1 | EE = ES+VALID | T1 = −ES | | get hit1 |
| CHKENTRY2 714 | WS < EE cmp2 | X_LO = WE−T1 | T1 = −WS | | get hit2 |
| HIT1 (gt1) 716 | WS > ES gt1 | X_HI = EE−T1 | T1 = −X_LO | WS = ES (eq1) | domark; !gt1 −> !trimlo |
| HIT2 (gt2) 718 | WE > EE gt2 | (!gt1) VALID = VAL−XLO | (gt1) T1 = X_HI | WE = EE (eq2) | >> dotrimhi,lo,noth,invalid |
| ACT1 720 | | (Thi) VALID = V−Xhi<br>(Thi & !hard):SIZE = Nvalid<br>(Tlo & hard) OFFSET = O+Xlo<br>(Tlo & !hard): SIZE = SZ−Xlo | | | Operations depend on which trim |
| ACT2 722 | | Tlo:STBLA=+Xlo | T2 = −SIZE | | |
| ACT3 724 | OFFSET +X > SIZE | (Tlo & hard); OFFS ?−Size<br>(Tlo & !hard) Ebptr = +Xlo | T2 = −Bufsize0 | | OFFSET gets dec if > size |
| ACT4 726 | Ebptr > Highbptro | Ebptr = ?−Bufsize0 | | | EBPtr wraps around Bfr |
| CRAMWR 732 | | | | | |

*FIG. 26*

① TRIMLO

!WE > EE +
!WE = EE

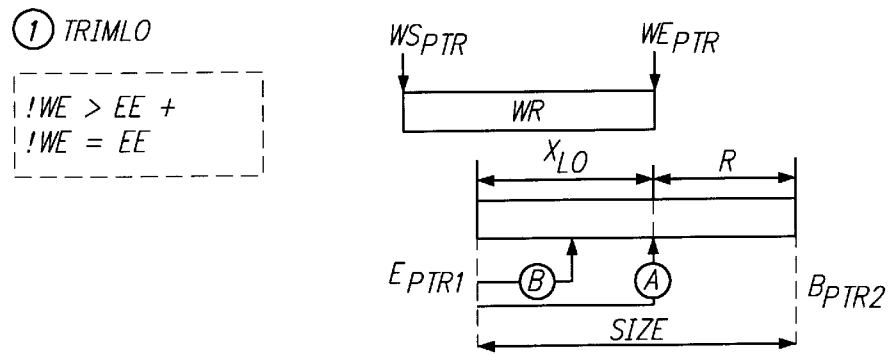

Ⓐ = EOFFSET: Leave things alone

Modify size valid $OFFSET = E_{OFFSET} - X_{LO}$ $BPTR = WE_{PTR}$ $SIZE = ESIZE - X_{LO} = R$
$\quad = B_{PTR2} - WE_{PTR}$ $VALID = EVALID$ if $VALID \leq E_{SIZE} - E_{OFFSET}$
$\quad\quad\quad\quad else = E_{SIZE} - E_{OFFSET}$ $NEWLBA = E_{STLBA}$ Ⓑ = EOFFSET: agreement BPTR, ELBA....

↓ size valid $OFFSET = 0$ $BPTR = WE_{PTR}$ $SIZE = E_{SIZE} - X = R \quad\quad X - E_{OFFSET}$
$\quad = B_{PTR2} - WE_{PTR}$ $VALID = 0$ if $VALID \leq WE_{PTR} - (E_{OFFSET} + E_{BPTR})$
$\quad\quad\quad else = VALID - (WE_{PTR} - (E_{OFFSET} + EB_{PTR}))$ (Max = New size)

$NEWLBA = E_{STLBA} - (WE_{PTR} - (E_{OFFSET} + EB_{PTR}))$
$\quad\quad\quad = E_{STBLA} + T(X - E_{OFFSET})$

FIG. 27A

② TRIMHI

!WE>ES&WE>EE)
(WE=ES&WE=EE)

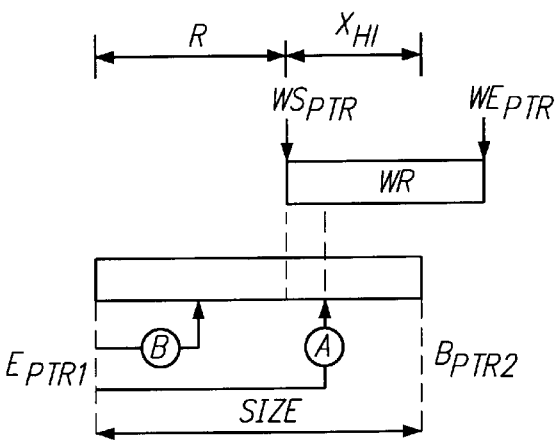

Ⓐ OFFSET

OFFSET=0
BPTR=$E_{PTR}$
SIZE=ESIZE-$X_{HI}$=R
      =$WS_{PTR2}$-$E_{BPTR1}$
VALID=0 if EVALID ≤ $E_{SIZE}$ -$E$! $_{OFFSET}$
            else VALID=$E_{VALID}$-($ESIZE$-$E_{OFFSET}$) (Max=New Size)
NEWLBA=$E_{STLBA}$+($E_{SIZE}$-$E_{OFFSET}$)

Ⓑ = OFFSET

OFFSET=$E_{OFFSET}$
BPTR=$E_{PTR1}$
SIZE=$E_{SIZE}$-X=R
      =$WS_{PTR}$-$E_{BPTR1}$
VALID=EVALID if EVALID ≤ R-$E_{OFFSET}$
            else=R-$E_{OFFSET}$

NEWLBA=$E_{STLBA}$

FIG. 27B

FIG. 28 smdecode

| WR BFR SCAN 704 | > | + | − | CHK= | |
|---|---|---|---|---|---|
| GET ENTRY 710 | | | | | get invalid |
| CHKENTRY1 712 | WE > ES cmp1 | EE = ES+ESIZE | | | get hit1 |
| CHKENTRY2 714 | WS < EE cmp2 | X_LO = WE−T1 | T1 = −ES | | get hit2 |
| HIT1 (gt1) 716 | WS > ES gt1 | X_HI = EE−T1 | T1 = −WS | WS = ES (eq1) | domark; !gt1 −> !trimlo |
| HIT2 (gt2) 718 | WE > EE gt2 | (!gt1) VALID = VAL−XLO | (gt2) T1 = −X_LO | WE = EE (eq2) | gt2−>!trimlo >> dotrimhi,lo,invalid |
| ACT1 720 | Tlo:Xlo > Eoffset | Tlo: NewSize=Sz−Xlo<br>Thi: R = Sz−Xhi | T2 = −Eoffset | | >>Tlo: !sideA ? |
| ACT2 722 | Thi: R > Eoffset | TloA: T1B = Esz−Eoffset<br>TloB: T1B = Xlo−Eoffset<br>Thi: NewSize=Sz−Xhi | | | >> Thi: !sideA ? |
| ACT3 724 | TloA: Evalid > T1A<br>TloB: Evalid > T1B | TloA: Noffset = Eoffset−Xlo<br>ThiA: T2A = Esz−Eoffset<br>TloB: T2B = R−Eoffset | TloB: TX = −T1B | lastlba = highbptro>><br>Nbptr ? Lowbptro | TloA (Nvalid = ? T1A:Evalid)<br>TloB (Nvalid = ? TBC: doinv)<br>doinv.next > CRAMWR |
| ACT4 726 | ThiA: Evalid > T2A<br>ThiB: Evalid > T2B | ThiB1: Nvalid = Evalid−T1B<br>ThiA: Nstlba = Estlba+T2A | ThiA: TX = −T2A | | ThiA (Nvalid = ? TBC: doinv)<br>ThiB (Nvalid = ? T2B:Evalid)<br>doinv.next > CRAMWR |
| ACT5 728 | TloB: Nvalid > Nsize | ThiB1: Nstlba = Estlba−T1B<br>ThiA1: Nvalid = Evalid−T2A | | | TloB1: Nvalid = ? Nsize:<br>Nvalid |
| ACT6 730 | ThiA1: Nvalid > Nsize | | | | ThiA1: Nvalid = ? Nsize:<br>Nvalid |
| WRCRAM 732 | | | | | Tlo, TloB: Nbptr = WE<br>TloB, ThiA: Noffset = 0 |
| TrimLo=!gt2 & !eq2<br>735 | TrimHi =(gt1 & gt2)\|<br>(gt1 & eq2) | | Invalidate =(!gt1 & gt2) \|<br>(!gt1 & eq2) | | |

EMBEDDED CACHE MANAGER

Reference to Related Application

This is a continuation-in-part of U.S. patent application Ser. No. 08/940,074 filed on Sep. 29, 1997, now abandoned.

FIELD OF THE INVENTION

The present invention relates to cache systems. More particularly, the invention relates to a cache buffer manager and a method and apparatus for managing a cache buffer embedded within a storage device for transferring data between a host device and the storage device.

BACKGROUND

A cache buffer is a high speed memory buffer inserted between a host and a storage device, such as a disk drive, to store those portions of the disk drive data currently in use. Since the cache, typically implemented as semiconductor memory, is several times faster than the disk drive, using the cache can reduce the effective disk access time. Conventionally, a firmware cache manager has controlled transfer of data into and out of the cache buffer, and has managed the data stored in the cache buffer. A typical cache manager utilizes a cache directory containing data block memory addresses, and control bits for cache management and access control. The cache manager searches the cache directory to fetch and store data blocks in the cache buffer, and uses a replacement strategy to determine which data blocks to retain in the cache buffer and which to discard.

However, a major disadvantage of existing cache managers is slow operational speed in detecting data blocks in the cache buffer. This is because the cache manager must search through the cache directory and examine the entries therein to determine if one or more requested data blocks are in the cache buffer. This is a time consuming process, typically performed by a microprocessor executing instructions requiring multiple clock cycles. As such, existing cache managers commonly search for the first of a set of consecutive data blocks, and rarely search for all the data blocks in the set.

Most cache buffers are organized into multiple segments each storing a set of data blocks. As a result, a logically consecutive set of data blocks may exist as multiple subsets stored in different cache segments. Another disadvantage of existing cache managers is that, although all the data blocks of a requested set may exist as subsets stored in different cache segments, because of their slow operational speed, existing cache managers can only search for the subset containing the first data block in the requested set. As a result, such cache managers record a partial hit and attempt to transfer the remaining subsets into the cache buffer from the disk drive. This is a very time consuming task that causes replacement of existing, and most likely useful, data blocks, wastes precious cache buffer space, and prevents seamless delivery of the requested consecutive data blocks to the host.

Yet another disadvantage of existing cache managers is their inability to effectively buffer data from the host. Every time the host issues a write command, the cache manager is interrupted to store data from the host into the cache buffer and communicate with the disk drive. As such, there is little or no parallelism between the host and the cache manager in handling data. Further, the cache manager must take the time to execute its replacement strategy to store the data into the cache buffer and keep the cache directory coherent. As multiple write commands are issued by the host, existing cache managers have no ability to buffer the data, and keep the cache coherent, without multiple interruptions.

There is, therefore, a need for a method of managing a cache buffer which quickly, and efficiently, detects data in the cache buffer. There is also a need for such a method to quickly, and efficiently retrieve data stored in the cache buffer. There is also a need for such a method to quickly, and efficiently, buffer multiple data transfers into the cache buffer. There is also a need for an improved cache manager architecture embedded within a random access mass storage device, such as a hard disk drive.

SUMMARY

The present invention satisfies these needs.

In one embodiment, the present invention provides method of managing the data in a cache buffer including data segments, and transferring data into and out of the cache buffer. The method of the present invention can be used to respond directly to read and write commands from a host, and to provide a cache manager with cache status information such as cache miss, partial hit and full hit information. A cache list for organizing the data comprises a plurality of entries each including information identifying a corresponding cache segment, and a set of consecutive data blocks stored in the cache segment. Providing cache status for a requested set of data blocks includes traversing the cache list to locate entries identifying the starting data block in the requested set, and consecutive data blocks successively following the starting data block without interruption, and identifying as a missing data block the first data block in said succession, including said starting data block, not identified in any entry. The first missing data block is used to determine status: a full hit if the missing data block is not in the requested set; a miss if the missing data block is the starting data block in the requested set; or a partial hit otherwise. Further, in case of a full or partial hit, the identity of said missing data block is also provided. The cache status information can be used by the cache manager to transfer the requested set of data blocks out of the cache buffer. Alternatively, the step of traversing the cache list can include locating entries identifying the starting data block, and consecutive data blocks successively following the starting data block up to, and including, the last data block of the requested set. Therefore, only cache status of the requested data blocks is checked. After locating an entry identifying a data block next in sequence to the last data block of the requested set, indicating a full hit, the requested data blocks can be transferred out. Similarly, after locating a missing data block, all data blocks from the starting data block up to the missing data block can be transferred out. Additionally, this approach enables the firmware to fetch any missing or additional data blocks from disk, as in the case of a partial cache hit.

In response to a write command for a requested set of data, the cache list is traversed to locate all entries identifying sets of data blocks overlapping the new set to be written to cache. If a located entry identifies a set of data blocks fully overlapping the new set, there is a full hit. If no entry is located, there is a miss. Otherwise, there is a partial hit. This information can be reported to the cache manager to transfer the new set of data blocks into the cache buffer. The new set can be automatically transferred into a predesignated buffer area selected by the cache manager. In that case, each of said located entries is marked invalid so that they are not considered in response to subsequent read commands. In case of a partial hit or a miss, the above steps can further include locating an entry previously marked invalid, and updating the information in the invalid entry to identify: (1) the predesignated buffer as a corresponding data segment, and (2) the new set as the set of data blocks stored in the corresponding data segment.

In case of a full hit, where a located entry identifies said starting data block, and the sequence of the last data block of the set identified in the entry matches or succeeds that of the last data block of the new set, the new set can be transferred to the corresponding data block locations in the segment identified in the entry. When data is transferred into the cache buffer in case of a full or partial hit, each located entry can be updated to identify a set of data blocks which do not overlap the new set.

The present invention provides efficient and quick scan of the cache list to find every data block requested and transfer the data if necessary. It saves the cache manager from the labor intensive task of searching for data, which reduces performance of the cache manager. Given a starting data block in a requested set, unlike existing systems, the present invention searches to find data blocks beyond the requested data blocks. As a result, after traversing the cache list, the cache manager can be provided with cache status based on the requested set, including a miss, partial hit, full hit, and the first missing data block which needs to be read into the cache buffer from the disk drive.

The transfer operation provides the ability to perform real-time data gathering of discontinuous pieces of data in the cache buffer, and to seamlessly provide the host with a single stream of data. This is because a cache list traverse provides information about what data is in the cache buffer and where it is. Therefore, the data can be transferred without spending time between successive searches to find the next piece of data to transfer to the host.

The present invention also provides buffering of data from the host. Multiple write commands from the host are buffered until the cache manager decides to write the buffered data to disk. This allows the cache manager to operate without interruption by every write command. Since subsequent writes can overlap one another, the present invention provides marking and trimming capabilities to resolve overlaps as described above. As such, all overlaps can be resolved in real-time, keeping the cache list coherent, and allowing for subsequent reads.

BRIEF DESCRIPTION OF THE DRAWINGS

These and other features, aspects and advantages of the present invention will become better understood with regard to the following description, appended claims and accompanying drawings where:

FIG. 20 is a functional matrix diagram showing simultaneous parallel processing steps carried out by the arithmetic logic unit of the FIG. 15 cache controller during the FIG. 19 cache read transfer process.

FIG. 24 is a table showing all possible overlap conditions which may be detected during an LBA mode write scan process.

FIG. 26 is a functional matrix diagram showing simultaneous parallel processing steps carried out by the arithmetic logic unit of the FIG. 15 cache controller during write LBA scan mode operation of the cache controller state machine in accordance with the FIG. 23 cache read transfer process.

FIGS. 27A and 27B show two cache trim operations, one of which may be performed as a result of the buffer mode write scan process.

FIG. 28 is a functional matrix diagram showing simultaneous parallel processing steps carried out by the arithmetic logic unit of the FIG. 15 cache controller during write buffer scan mode operation of the cache controller state machine carried out in accordance with the FIG. 23 cache read transfer process.

DESCRIPTION OF PREFERRED EMBODIMENTS

Figure 1:
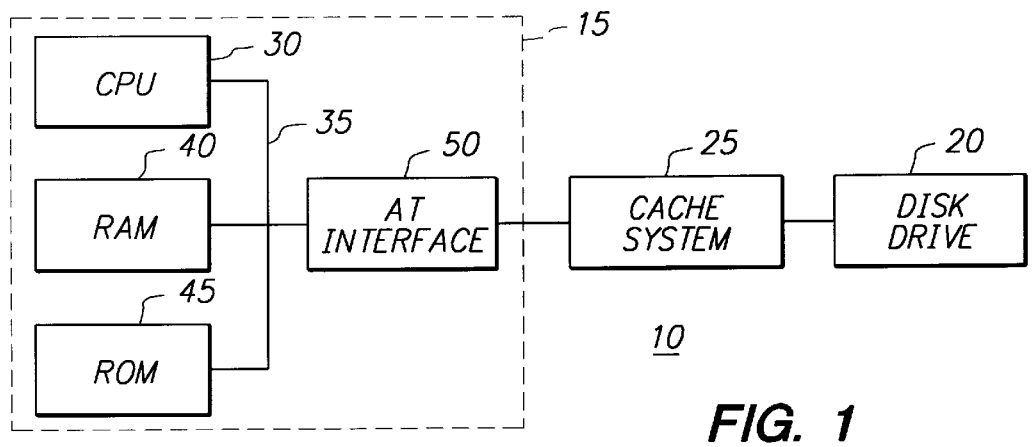
FIG. 1 is a block diagram of an example of a computer architecture in which the present invention can be implemented.

FIG. 1 shows a block diagram of an exemplary computer system 10 in which a method embodying aspects of the present invention can be implemented. The computer system 10 typically includes a host 15 and a storage device, such as a disk drive 20, interconnected via a cache system 25. The cache system 25 is utilized to buffer transfer of data between the host 15 and the disk drive 20 according to the present invention. As those skilled in the art will recognize, the present invention is capable of being implemented in a system having other storage devices. Additionally, the host 15 generally refers to a host/AT interface, which one skilled in the art will recognize to include, for example, a CPU 30 interconnected via a Bus 35 to a RAM 40, ROM 45 and an AT interface 50.

Figure 2:
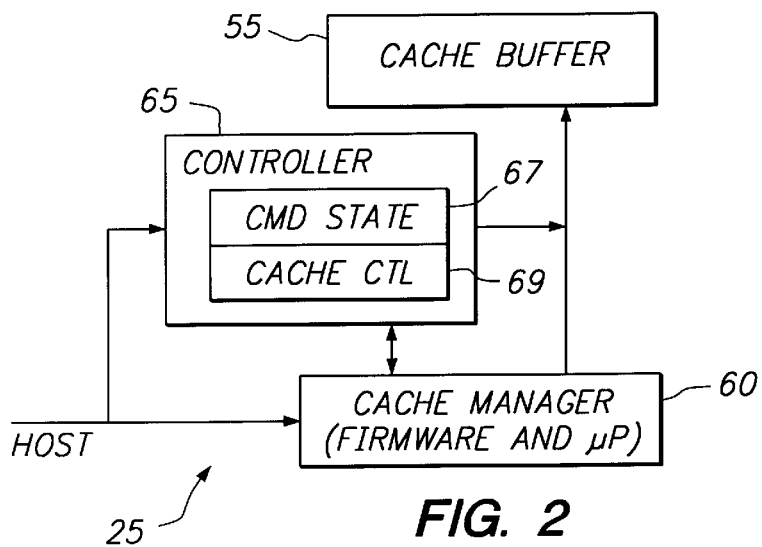
FIG. 2 shows a block diagram of a cache system including a cache buffer, a firmware-implemented cache manager, and a hardware controller including a command state machine and a cache control state machine according to principles of the present invention.

Referring to FIG. 2, a first embodiment of the presently preferred cache system 25 includes a cache buffer 55 and a cache manager 60 for storing data into and retrieving data from the cache buffer 55. In one aspect, the present invention provides a method of managing the data in the cache buffer 55, and transferring data into and out of the cache buffer 55 is implemented into a hardware controller 65 including a command state machine 67 and a cache control state machine 69. The method of the present invention can be used to respond directly to read and write commands from the host 15, and to provide the cache manager 60 with cache status information such as cache miss, partial hit, and full hit information. The cache manager is most preferably implemented as firmware executed by a microprocessor.

Figure 3:
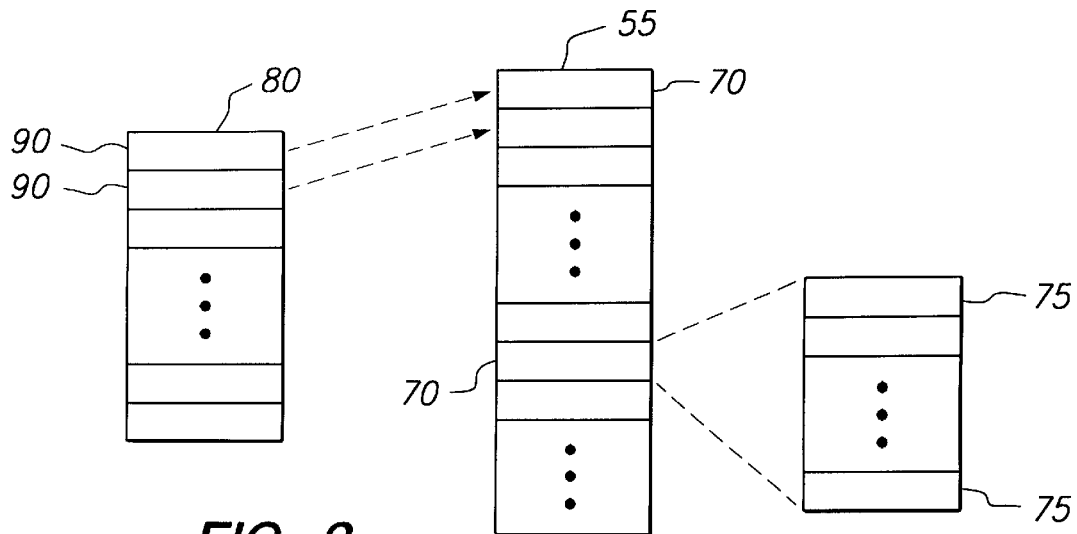
FIG. 3 shows a block diagram of a cache buffer organized into segments, and an embodiment of a cache list according to principles of the present invention for managing transfer of data into and out of the cache buffer.

Referring to FIG. 3, the cache buffer 55 is organized into a plurality of cache segments 70 each for storing one or more data blocks 75. To manage the data segments 70 and the data stored therein according to the present invention, a cache list 80 comprises a plurality of entries 90 each including information identifying: (1) a corresponding cache segment 70, and (2) a set of consecutive data blocks 75 stored in the cache segment 70.

Providing cache status for a requested set of data blocks 75 includes traversing the cache list 80 to locate entries 90 identifying the starting data block in the requested set, and consecutive data blocks 75 successively following the starting data block without interruption, and identifying as a missing data block a first data block in said succession of consecutive data blocks 75, including said starting data block, not identified in any entry 90. The missing data block is then used to provide cache status including: a full hit if the missing data block is not in the requested set; a miss if the missing data block is the starting data block in the requested set; or a partial hit otherwise. Further, in case of a full or partial hit, the identity of said missing data block is also provided. The cache status information can then be used by the cache manager 60 in order automatically to transfer the requested set of data blocks 75 out of the cache buffer 55.

As such, the cache manager 60 is provided with cache status for the requested data blocks, and a look ahead into the cache buffer 55 for all data blocks 75 therein which are in logical sequence with the staring data block. Alternatively, the step of traversing the cache list 80 can include locating entries 90 identifying the starting data block, and consecutive data blocks 75 successively following the starting data block up to, and including, the last data block of the requested set. Therefore, only cache status of the requested data blocks 75 is checked.

In response to a read command, after locating an entry 90 identifying a data block next in sequence to the last data block of the requested set, indicating a full hit, the requested data blocks 75 are transferred out by: (1) denoting the starting data block as a running data block, (2) traversing the cache list 80 to locate the particular entry 90 identifying the running data block, (3) accessing the data segment 70 corresponding to the located entry 90, (4) transferring as many of data blocks 75 therein within the range of the requested set, and (5) if the sequence of the last data block of the requested set succeeds that of the last data block of the set identified in the located entry 90, denoting as the running block, the block next in sequence to said last block of the identified set, and repeating steps (2)–(4).

Similarly, in response to a read command, after locating a missing data block, all data blocks 75 from the starting data block up to the missing data block are transferred by: (1) denoting the starting data block as a running data block, (2) traversing the cache list 80 to locate the entry 90 identifying the running data block, (3) accessing the data segment 70 corresponding to the located entry 90, (4) transferring as many of data blocks 75 therein within the range of the requested set, and (5) if the sequence of the missing data block succeeds that of the last data block of the set identified in the located entry 90 by at least two, denoting as the running block, the block next in sequence to said last block of the identified set, and repeating steps (2)–(4).

To service a write command for a requested set including a starting data block, the cache list 80 is traversed to locate all entries 90 identifying sets of data blocks 75 overlapping the requested set. If a located entry 90 identifies a set of data blocks 75 fully overlapping the requested set, there is a full hit. If no entry 90 is located, there is miss. Otherwise, there is a partial hit. This information can be reported to the cache manager 60 to transfer the requested set of data blocks 75 into the cache buffer 55.

Finding overlaps includes comparing the range of the data blocks 75 in the requested set to the range of data blocks 75 identified in each entry 90. Four basic types of comparisons include range checking for the starting data block of the requested set, for the last or ending data block of the requested set, for the starting data block of each set identified in the entries 90, and for the ending data block of each set identified in the entries 90.

In order to minimize fragmentation, the requested set is preferably stored in a contiguous area of the buffer 55. Therefore, the requested set can be automatically transferred into a predesignated buffer area selected by the cache manager 60. In that case, each of said located entries 90 is marked invalid so that they are not considered in response to subsequent read commands. In case of a partial hit or a miss, the steps can further include locating an entry 90 previously marked invalid, and updating the information in the invalid entry 90 to identify: (1) the predesignated buffer as a corresponding data segment 70, and (2) the requested set as the set of data blocks 75 stored in the corresponding data segment 70.

In case of a full hit, where the located entry 90 identifies said starting data block, and the sequence of the last data block of the set identified in the entry 90, matches or succeeds that of the last data block of the requested set, the requested set can be transferred into the corresponding data blocks 75 in the segment 70 identified in the entry 90.

When data is transferred into the cache buffer 55 in case of a full or partial hit, each located entry 90 can be updated to identify a set of data blocks 75 which do not overlap the requested set. In case of a buffer overlap, where the predesignated buffer overlaps a data segment 70 identified in an entry 90, all such entries 90 are updated to resolve overlaps by identifying a segment size which does not overlap the predesignated buffer.

Referring to FIGS. 2 and 4–13, an exemplary embodiment of the present invention, implemented as two interacting state machines 67 and 69 is described. The exemplary implementation is primarily specific to an AT interface. However, those skilled in the art recognize, the present invention is also capable of being implemented for other interfaces between a host device and a storage device.

The state machines include a Command State Machine (CM) 67 and a Cache Control State Machine (CSM) 69. Both state machines 67, 69 can be implemented in a logic circuit, such as an ASIC, as described below. Generally, CM 67 stores commands issued by the host and keeps a command history. CSM 69 performs operations in response to the commands to manage transfer of data into and out of a cache buffer 55. The cache buffer 55 is a portion of memory starting at a low address and proceeding to a high address whereupon it rolls over to the low address. The buffer 55 is organized into a variable number of segments, up to at least thirty-two, each for storing a plurality of data blocks (Command Logical Block Address -LBA). In the following description the cache manager 60 is referred to as "firmware" as it is typically, although not necessarily, implemented as a firmware-programmed microprocessor embedded within the storage device, e.g. disk drive.

CM 67 includes a Command FIFO in external RAM, comprising at least eight Command entries. For interfaces where command queuing is supported (SCSI) the Command FIFO already exists. Each Command entry includes:

Command LBA—the first LBA required by the Command.
Transfer Count—the number of LBAs to be transferred.
Buffer Pointer/Cache Entry Pointer—the memory address of a Segment where data has been stored, or the pointer to a Cache Entry describing that Segment.

Figure 4:
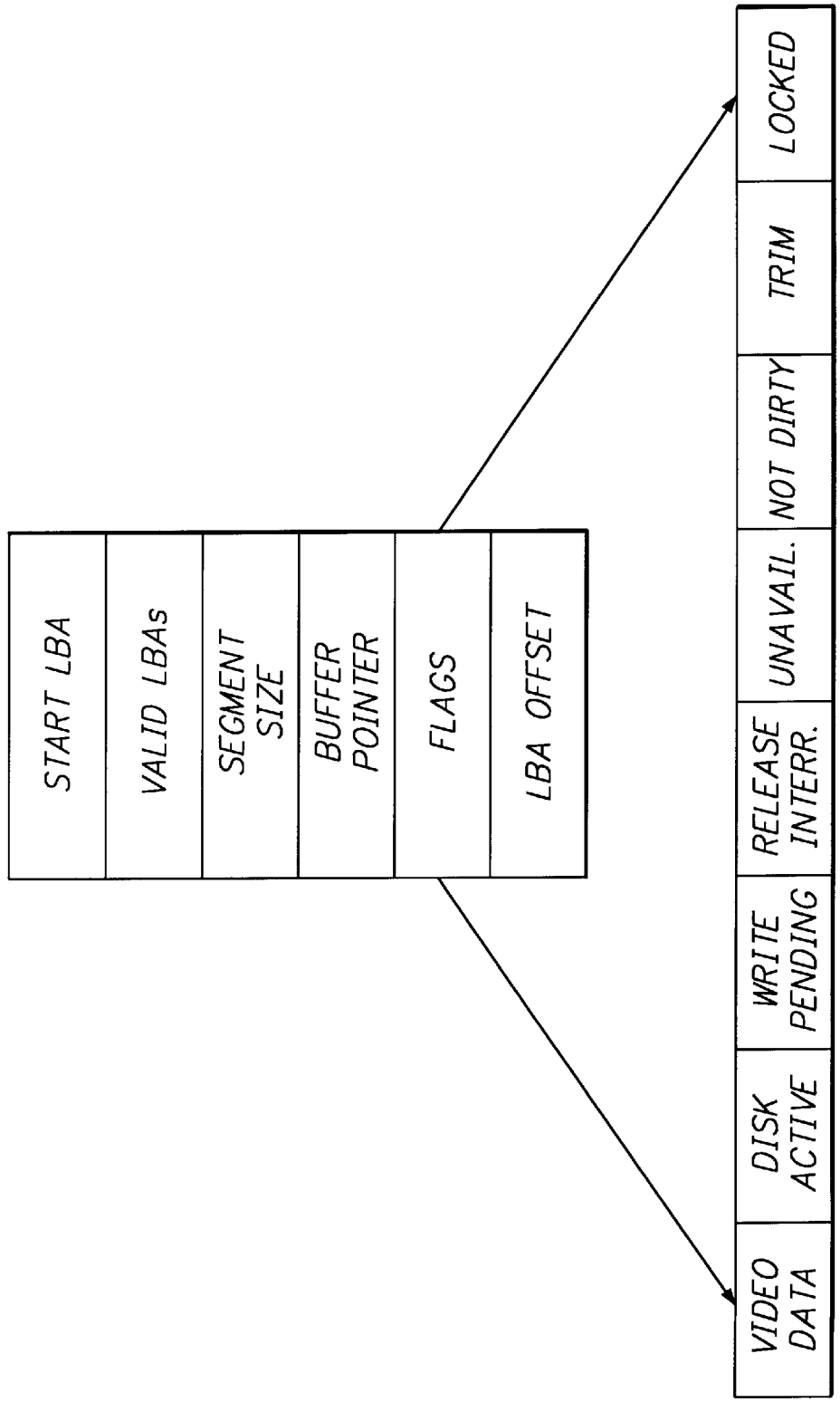
FIG. 4 shows an example cache list entry.

Referring to FIG. 4, the CSM 69 includes a Cache List comprising thirty-two entries each entry 90 including:

Start LBA—lowest LBA stored in a corresponding Segment.
Valid LBA—the number of contiguous valid LBAs in the Segment starting with the Start LBA.
Segment Size—the size reserved for the Segment in the Buffer; expressed as the number of LBAs that can be stored therein.
Buffer Pointer—starting address of the Segment in the Buffer.
LBA Offset—the offset of the Start LBA relative to the starting address of the Segment.
Flags:
Locked—Segment locked by the CSM.
Trim—Cache Entry needs to be trimmed by firmware.
Not Dirty—valid Cache Entry.
Unavailable—set by firmware to prevent CSM from using the Cache Entry.
Release Interrupt—set by firmware asking CSM to generate an interrupt when the Cache Entry is released.
Write Pending—there is write data in the Segment.
Disk Active—the disk drive is reading or writing in the Segment (set by firmware).
Video Data—data in the Segment can be used for video only.

CM 67 and CSM 69 interact with one another, the firmware 60, the host interface 50 and a disk drive interface 71 through the following registers:

Interrupt Register—includes flags associated with interrupts including:
CSM 69 generated interrupts:
CACHE MISS, PARTIAL HIT and FULL HIT, generated at the end of Detection operation.
CLEANUP, generated at the end of a Cleanup operation.
MARK, generated at the end of a Mark operation.
Host interface 50 generated interrupts:
NEW COMMAND, AUTO WRITE and AUTO READ (i.e. type of command).
Auto Enable Register—Configures CSM 69 to define the extent of its operation. The firmware can configure through this register:
Auto Scan—when enabled, allows CSM 69 to scan for read hits. If Auto Scan is enabled, then:
Auto Read Transfer—if there is a Full Hit, the data is transferred automatically.
Auto Partial Transfer—if there is a Partial Hit, as much data as there is found in cache is transferred automatically.
Auto Mark—when enabled, the CSM 69 is allowed to Mark for trimming all overlapping segments. If Auto Mark is enabled then:
Auto Trim—CSM Trims Cache Entries.
Auto Reuse—When Auto Trim enabled and Full Hit is detected, CSM 69 Reuses Cache Entry Segments, rather than Trims them.
Auto Allocate—CSM 69 uses invalid Cache Entries to store information pertaining to buffered write commands, including, Start LBA, Valid LBAs, Segment Address, Segment Size and Write Pending flag.
Auto EOC—CSM 69 writes buffer data and informs the host that write command is complete. Auto EOC allows stacking of write commands. In existing systems, transfer starts, but the host is not informed of its completion, until firmware resolves all overlaps.

The following definitions apply to the description below:
Auto Write interrupt—generated by CM to inform the firmware of Auto Write command.
Auto Mark Active step—posted by CM 67 to trigger CSM 69 to auto Mark.
Auto-Command—implies an automatic read or write command.
Command LBA—first LBA in a requested set of LBAs.
Cache LBA register—used by CSM 69 to Scan.
Cache Sector register—count of the number of sectors found for transfer.
Current Write Sector register—containing the number of available sectors for a write.
End LBA—contains sum of Command LBA and Transfer Count.
Entry Pointer—points to current Cache List entry.
Full Scan—describe it as compares to regular Scan.
Lock Flag—used to lock Segments during data transfer.
Maximum LBA—is the LBA boundary of the disk drive.
Missing LBA register—contains the last LBA sequential to the Start LBA not found in the cache.
Running LBA—used to scan the buffer, contains the identity of the last LBA Transferred, so subsequent LBAs can be Transferred.
Scan Active step—posted by CM to trigger CSM to Scan.
Sector Address—computed based on Segment Address.
Trigger Count Register—loaded with the number of sectors (LBAs) to be transferred out of a Segment with a hit.

Command State Machine (CM) 67

Figure 5A:
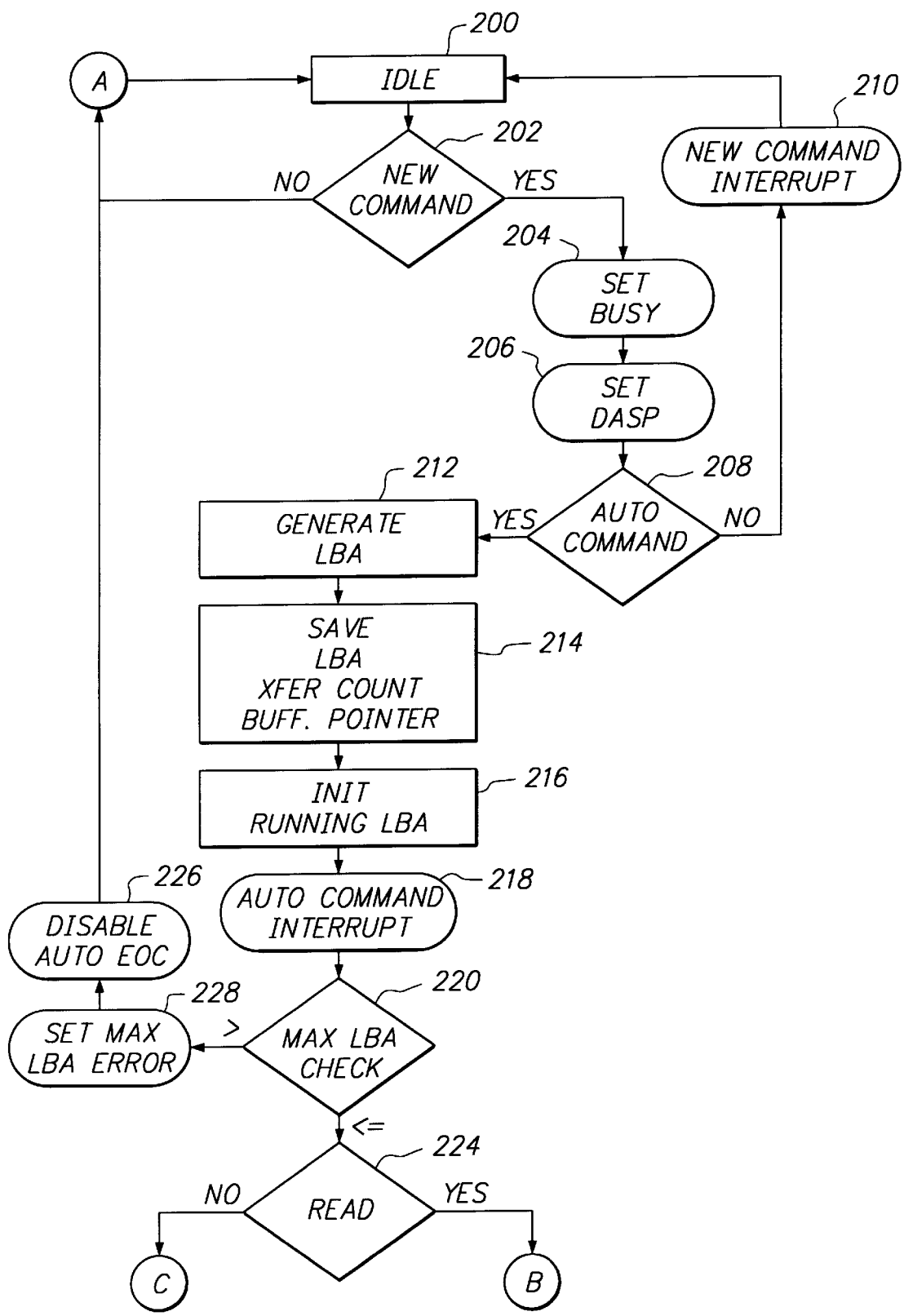
FIGS. 5a–5b show a flowchart illustrating an example command state machine implementation of the command processing aspect of the present invention.
Figure 5B:
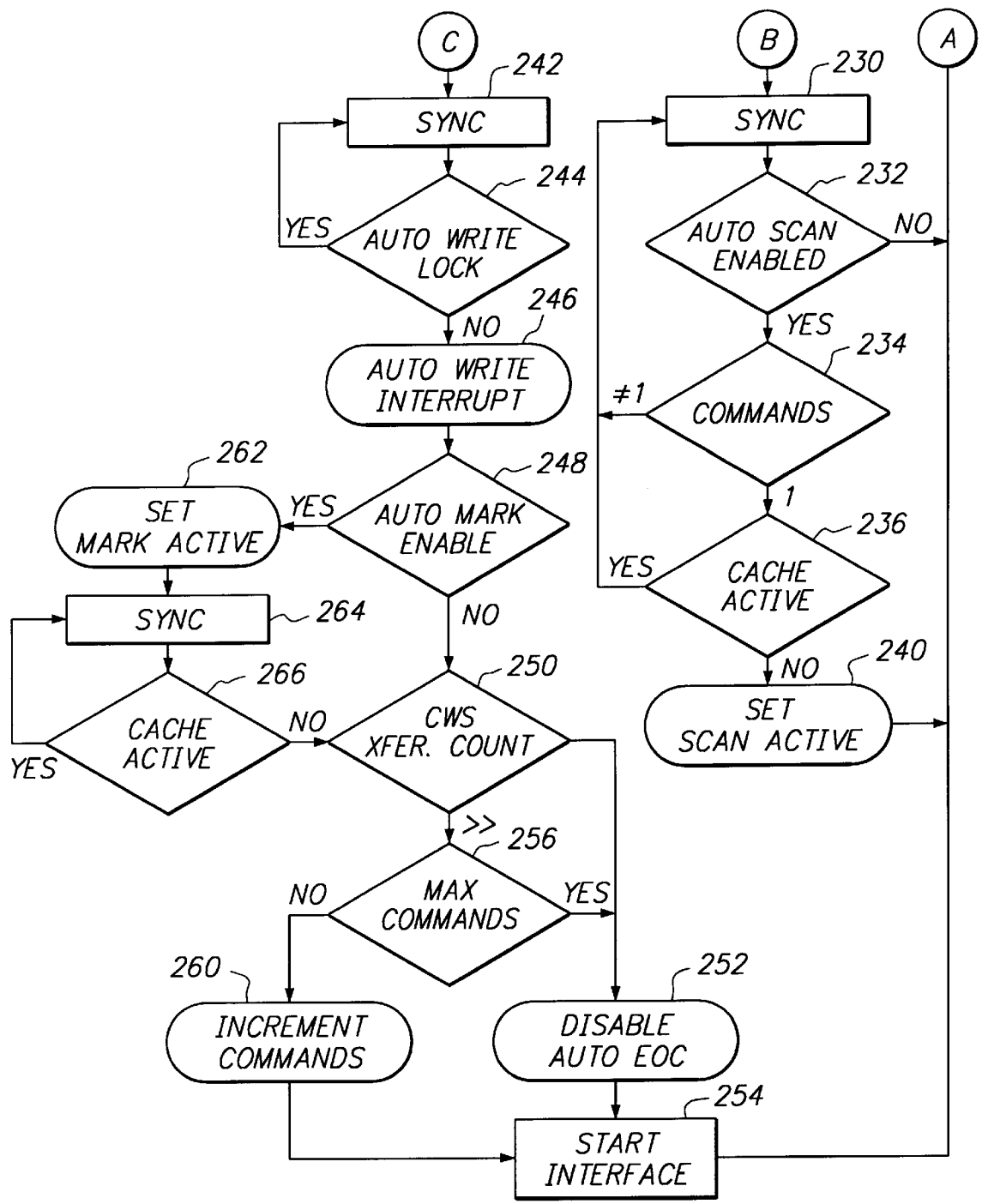

Referring to FIGS. 5a–5b, the operation of CM 67 is described. CM 67 idles at a step 200 and checks for a New Command at a step 202. Upon detecting a New Command at step 202, CM 67 sets an AT Interface specific BUSY signal at a step 204 and a DASP signal at a step 206. If the New Command is not an Auto-Command as tested at a step 208, CM 67 generates an interrupt for the firmware to handle the New Command at a step 210. An Auto-Command implies an automatic read or write. If the New Command is an Auto-Command, CM 67 saves the New Command information in the Command FIFO by generating a Command Logical Block Address (LBA) at a step 212, and saves the LBA, a Transfer Count and a Buffer Pointer at a step 214. The Buffer Pointer is provided by the firmware for writing data to a designated portion of the Buffer. CM 67 then initializes the Running LBA register to the Command LBA at a step 216. Having stored the information pertaining to the New Command in the Command FIFO, CM 67 issues an Auto-Command interrupt at a step 218 to inform the firmware that the New Command has been received.

CM 67 then compares the Command LBA with a Maximum LBA at a step 220 to determine if the Command LBA is within the boundaries of the disk drive. If the Command LBA is not within a boundary, then CM 67 sets a Max LBA Error condition at a step 228 and disables Automatic End of Command at step 226 to allow the firmware to deal with the error. If the Command LBA is within the boundary, CM 67 determines if the New Command is a read or a write command at step 224.

If the New Command is a read command, CM 67 synchronizes its operation with the CSM 69 and proceeds to determine if Auto Scan is enabled at a step 232. If Auto Scan is not enabled, CM 67 is done and proceeds to a step A. If Auto Scan is enabled, Scan still cannot be performed until it is determined that there are no stacked write commands that have unresolved overlaps. To determine such, CM 67 checks if an unresolved command counter does not equal "1" at a step 234. If the counter does not equal "1", CM 67 loops through steps 230–234 until firmware resolves the write command overlaps, which is indicated by the counter being decremented to equal "1". CM 67 then checks if the CSM 69 is active at a step 236. If CSM 69 is active, CM 67 loops through steps 230–236 until CSM 69 becomes inactive. Thereafter, CM 67 posts a Scan Active step at step 240 to trigger CSM to Scan, and proceeds to step A.

If the New Command is a write command, CM 67 synchronizes with CSM 69 at a step 242, and proceeds to determine if the firmware has locked the Buffer at a step 244 to prevent a race condition with the hardware. When the Buffer is unlocked, CM 67 generates an Auto Write interrupt at a step 246 to inform the firmware of the Auto Write command. CM 67 then determines if Auto Mark is enabled at a step 248; and, if so, posts a Mark Active step at a step 262 to trigger CSM 69 to auto Mark. CM 67 then waits for CM to complete auto Marking by synchronizing at step 264 and checking if CSM is active at step 266. When CSM 69 has completed auto Marking, CM 67 compares a Current Write Sector (CWS) register, containing the number of available sectors for a write, with the Transfer Count for the write command at a step 250. If there are enough available sectors to completely buffer the write, CM 67 determines if the Command FIFO is full at step 256. If the Command FIFO is not full, CM 67 increments the number of commands stored in the Command FIFO and starts the Interface at step 254 to transfer data from the host store into the Buffer starting from the Buffer Pointer. If the Command FIFO is full, or if there are not enough available sectors to completely buffer the write, CM 67 disables Automatic End of Command at step 252, so the firmware completes the command. CM 67 then starts the Interface at step 254, as above, to transfer as much data into the Buffer as possible, with the firmware completing the command and informing the host. CM 67 then proceeds to step A.

Therefore, CM 67 triggers CSM 69 in two possible ways by posting either: (1) a Scan Active at step 240, or (2) a Mark Active at step 262. CM 67 also starts the transfer Interface at step 254 to transfer data.

Cache Control State Machine (CSM) 69

Referring to FIG. 6–13, the operation of CSM 69 is described. CSM generally includes eight classes of operations: Decode, Scan, Detection, Transfer, Cleanup, Mark, Reuse, and Allocate.

Decode

Figure 6:
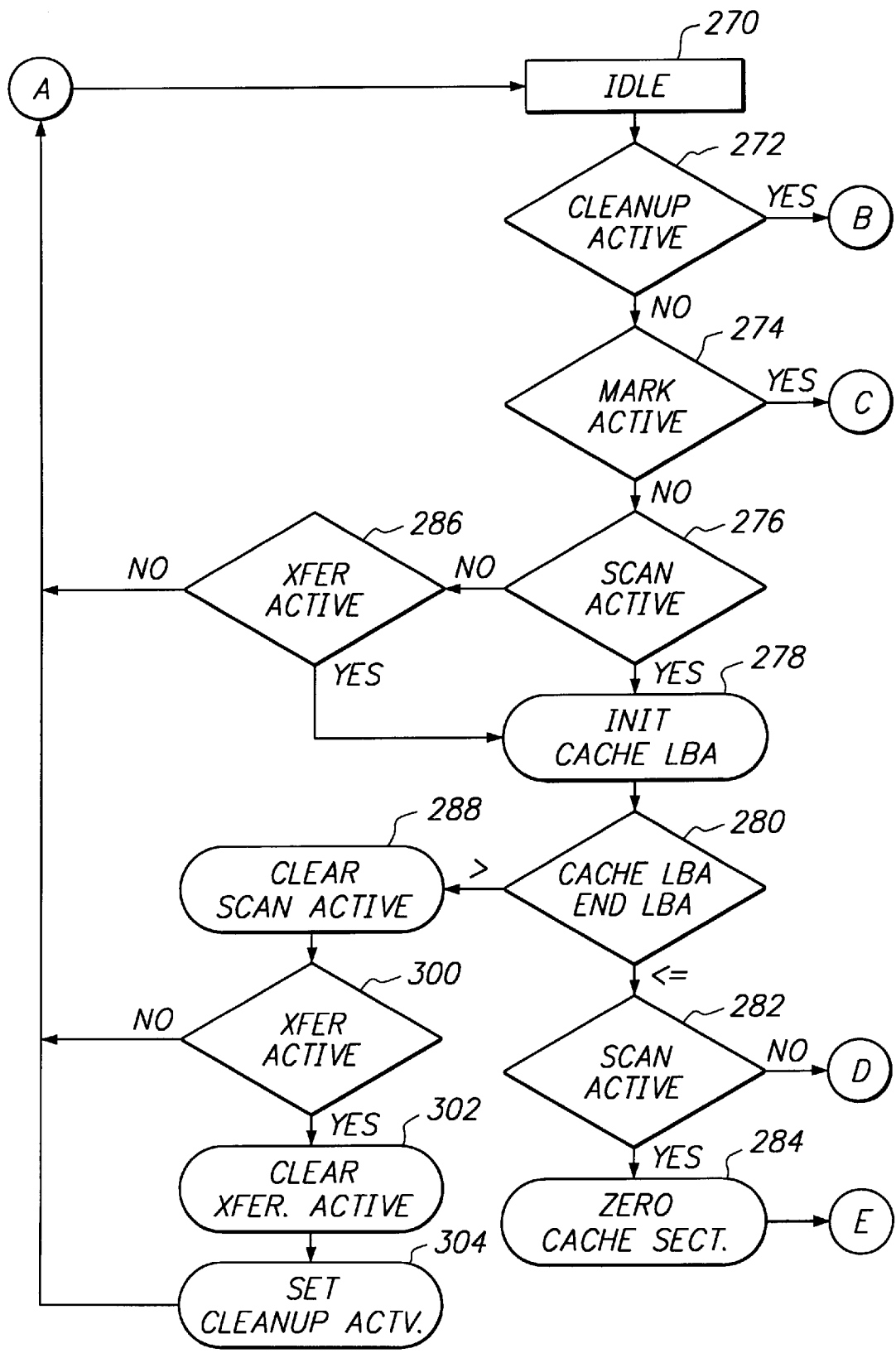
FIGS. 6–13 show a flowchart illustrating an example of a cache control state machine implementation of cache buffer management according to principles of the present invention.

Referring to FIG. 6, in Decode, CSM 69 determines the actions to be performed. CSM 69 idles at a step 270 until triggered, and first determines if a Cleanup Active step is posted at a step 272. If so, CSM 69 proceeds to step B to Cleanup. Otherwise, if a Mark Active step is posted at a step 274, CSM 69 proceeds to step C to Mark. Otherwise, CSM 69 determines if a Scan Active step is posted at a step 276. If so, CSM 69 initializes the Cache LBA register to the Command LBA at a step 278. CSM 69 then compares Cache LBA to the End LBA register at a step 280 which contains the sum of the Command LBA and the Transfer Count. If End LBA is greater than the Cache LBA, CSM 69 determines if a Scan Active is posted at a step 282. If so, this is the first Scan for the New Command, and so the Cache Sector count, containing the number of sectors found for Transfer, is initialized to zero at a step 284. Thereafter, CSM 69 proceeds to step E Scan.

If Scan Active is not posted in step 276, CSM 69 determines if a Transfer Active is posted at a step 286. If not, there is no further action to perform and CSM 69 proceeds to idle step 270. Otherwise, the Cache LBA is initialized at step 278 to the value of the Running LBA, which contains the identity of the last LBA Transferred, to allow Transfer of subsequent LBAs requested by the New Command. As transfers take place, the Running LBA is updated. If Cache LBA is greater than End LBA as tested at step 280, the New Command is satisfied, and CSM 69 clears the Scan Active at step 288. Thereafter, CSM 69 determines if Transfer Active is posted at step 300, and if so, it is cleared at step 302. CSM 69 then posts Cleanup Active at step 304, to trigger Cleanup to free any segments remaining locked by Transfer, and proceeds to idle state 270. If Cache LBA is less than End LBA as tested in step 280, and Scan Active is not posted as tested at step 282 (Transfer Active only), CSM 69 proceeds to step D to Transfer data found by Scan.

Therefore, all possibilities of the active steps of CSM 69 are:

Cleanup Active only;
Mark Active only;
Scan Active only—Scan to find (Detect) data in cache;
Transfer Active only—Transfer data found by a previous Scan; and
Scan Active and Transfer Active only—while Transferring data, Scan the cache to find new data to append to data being Transferred.

Scan

Figure 7:
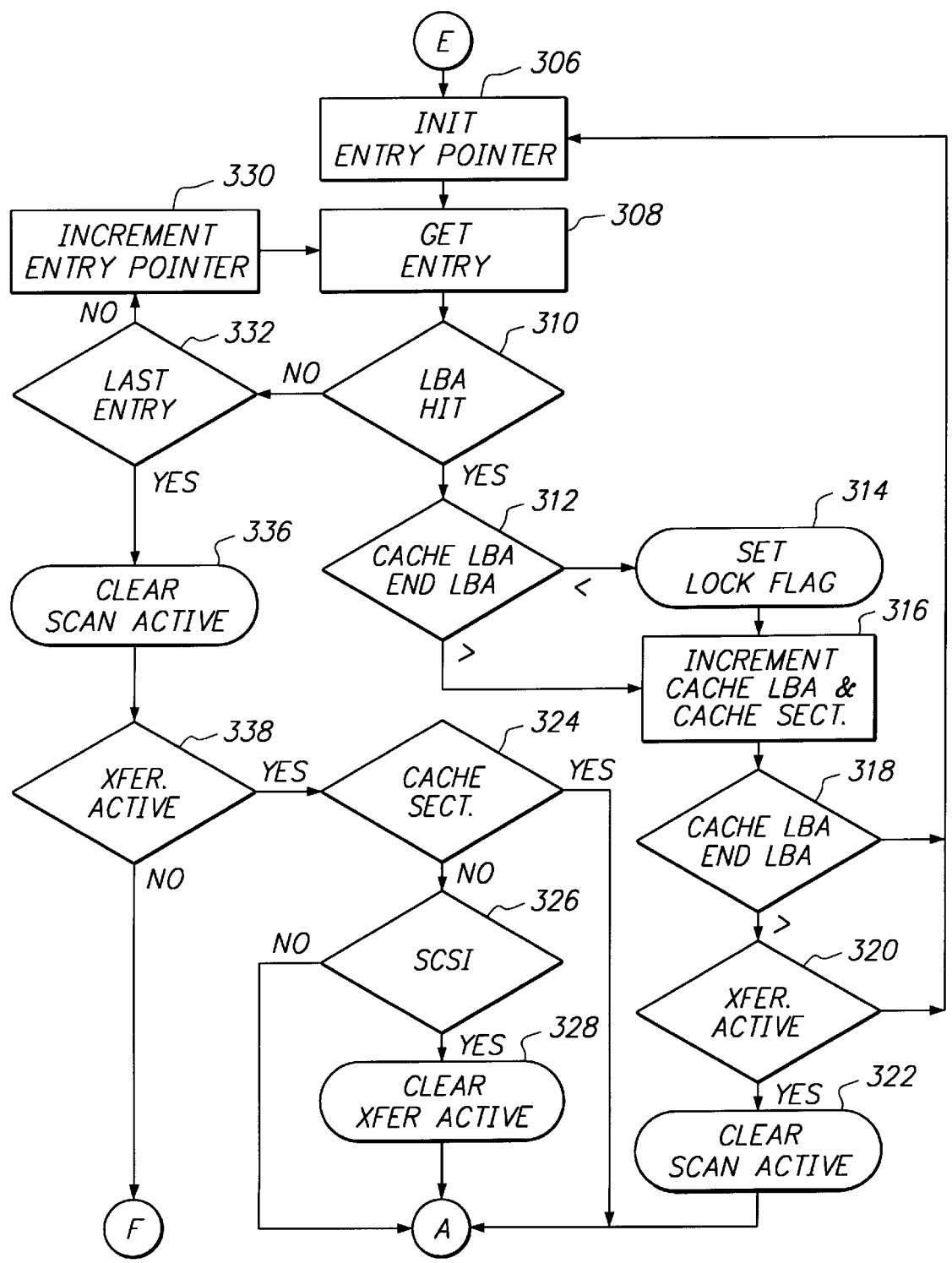

Referring to FIG. 7, when Scan Active step is posted, CSM 69 proceeds to step E, and begins by initializing the Entry Pointer to the first Cache List entry at step 306. CSM 69 accesses the contents of the entry at step 308 and determines if the Cache LBA is identified in this entry at step 310, i.e. an LBA hit.

If not, CSM 69 determines if the entry is the last Cache List entry at step 332, and if not, the Entry Pointer is incremented at step 330, and CSM 69 proceeds to the next entry at step 308. If the entry is the last entry, CSM 69 clears Scan Active at step 336, and determines if Transfer Active is posted at step 338. If Transfer Active is not posted, CSM 69 proceeds to step F to Detect. Otherwise, CSM 69 checks the Cache Sector register to determines if any new cache sectors have been found for Transfer at step 324. If not, in SCSI mode at step 326, CSM 69 clears Transfer Active at step 328 and proceeds to step A without any active steps. In AT mode, CSM 69 remains in transfer mode, and so, proceeds to step A with Transfer Active step set. If new cache sectors have been found at step 324, CSM 69 proceeds to step A, leaving Transfer Active set, for the found data sectors to be Transferred.

If there is an LBA hit as found at step 310, CSM 69 determines if the Cache LBA is greater than End LBA at step 312. This is because during a Scan, if Transfer Active is not set, CSM 69 may Scan Cache List entries for LBAs well beyond the New Command range, and so may find LBA hits beyond the End LBA. If the current LBA hit is beyond the New Command range, the Segment with the LBA hit therein need not be locked, as the Segment will not be used for the current Transfer. Therefore, if End LBA is greater than Cache LBA, CSM 69 locks the Segment corresponding to the current Cache List entry at step 314. Otherwise, the Segment is not locked. CSM 69 then increments the Cache LBA and the Cache Sector at step 316 based on the number of valid LBAs data found in this Segment.

CSM 69 again determines if the Cache LBA is greater than the End LBA at step 318. If not, there are more LBAs in the command range to find, and so, CSM 69 proceeds to Scan again at step 306, where the Entry Pointer is initialized to the first entry of the Cache List to find the remaining LBAs in the New Command range. However, if the Cache LBA is greater than the End LBA as tested at step 318, all LBAs in the command range have been found, and CSM 69 determines whether Transfer Active is posted at step 320. This allows CSM 69 to determine if it is in a Scan and Transfer process or in a purely Scan process in which it performs a full Scan of the Cache List. If the former case, both Transfer Active and Scan Active are set, and in the latter case, only Scan Active is set, whereupon CSM 69 proceeds to Scan beyond the range of the New Command at step 306. Although the Cache LBA is beyond the range of the New Command, the Scan process continues until no further LBA hits are found.

However, in a transfer process, there is no reason for CSM 69 to search for LBA hits beyond the New Command range, whereupon CSM 69 clears Scan Active at step 322 and proceeds to step A to Decode. There, since Transfer Active is set, Decode triggers Transfer to transfer data from Segments with LBA hits therein.

Detection

Figure 8:
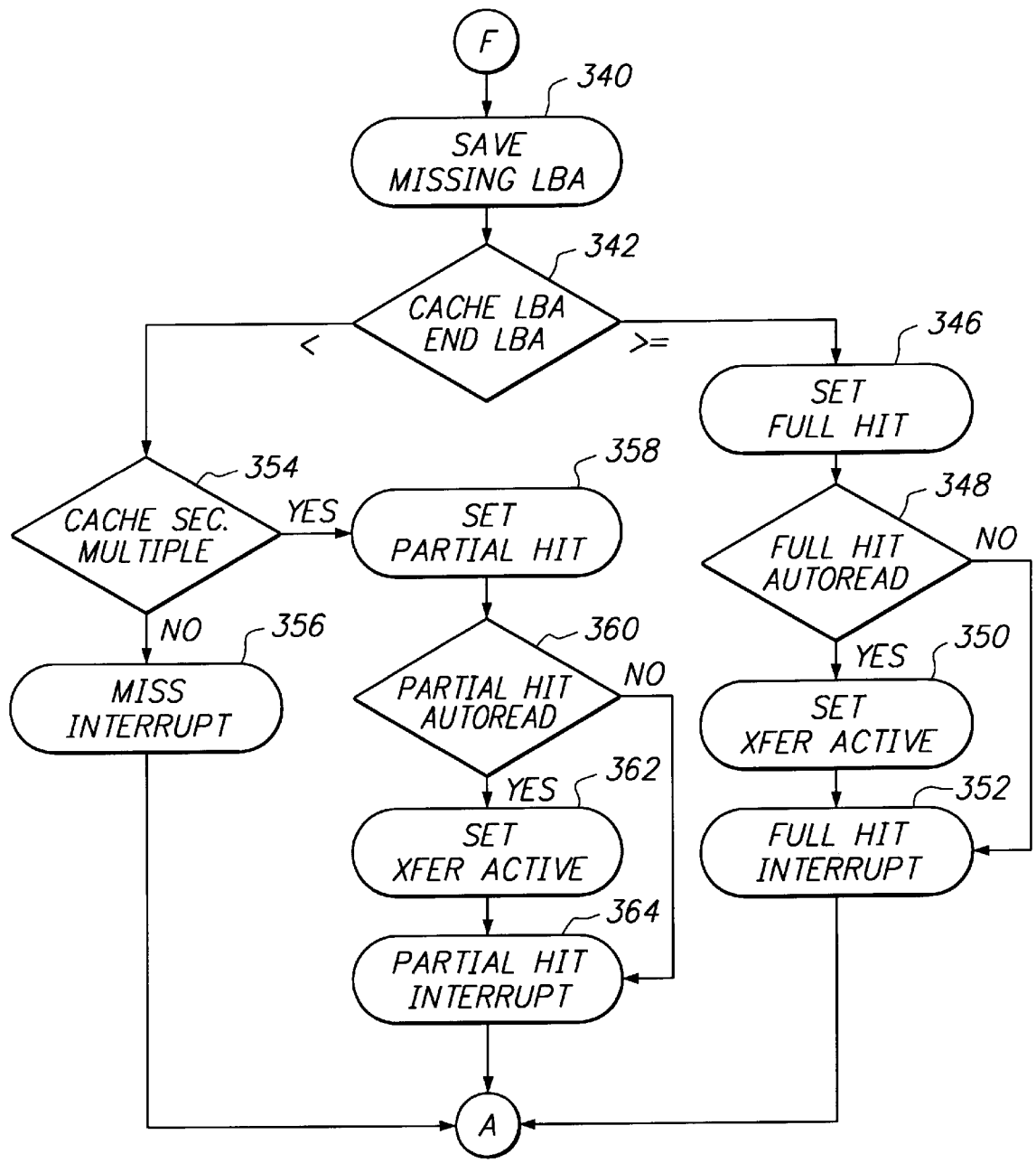

Referring to FIG. 8, in step F, CSM 69 interprets the "results" of the Scan process to provide information including a full hit, a partial hit or miss. CSM 69 also generates interrupts informing the firmware of such information, and based on the setting in the Auto Enable Register, transfers data.

By step F, the Cache LBA contains the last LBA sequential to the Start LBA not found in the cache. CSM 69 saves the Cache LBA in the Missing LBA register at step 340, and begins the process of determining a FULL HIT, a PARTIAL HIT, or a MISS. At the end of this determination process, CSM 69 proceeds to step A to Decode.

CSM 69 first determines if the Cache LBA is less than End LBA at step 342. If so, in this AT interface specific implementation, if the number of LBAs in the hit are smaller than a block count as determined at step 354, CSM 69 generates a MISS interrupt at step 354, otherwise, CSM 69 posts a PARTIAL HIT in the Interrupt Register at step 358. And, if Partial Hit Autoread is enabled, step 360, CSM 69 posts a Transfer Active at step 362, and generates a PARTIAL HIT interrupt at step 364. If Partial Hit Autoread is not enabled, CSM 69 generates a PARTIAL HIT interrupt at step 364, without posting Transfer Active step to trigger a Transfer, and proceeds to step A.

If Cache LBA is greater than or equal to End LBA as tested in step 342, CSM 69 posts the FULL HIT at step 346 in the Interrupt Register, and determines if Full Hit Autoread is enabled at step 348. If so, CSM 69 posts a Transfer Active at step 350, and generates a FULL HIT interrupt at step 352. If Full Hit Autoread is not enabled, CSM 69 generates a FULL HIT interrupt at step 352, without posting Transfer Active step to trigger a Transfer, and proceeds to step A.

Transfer

Figure 9:
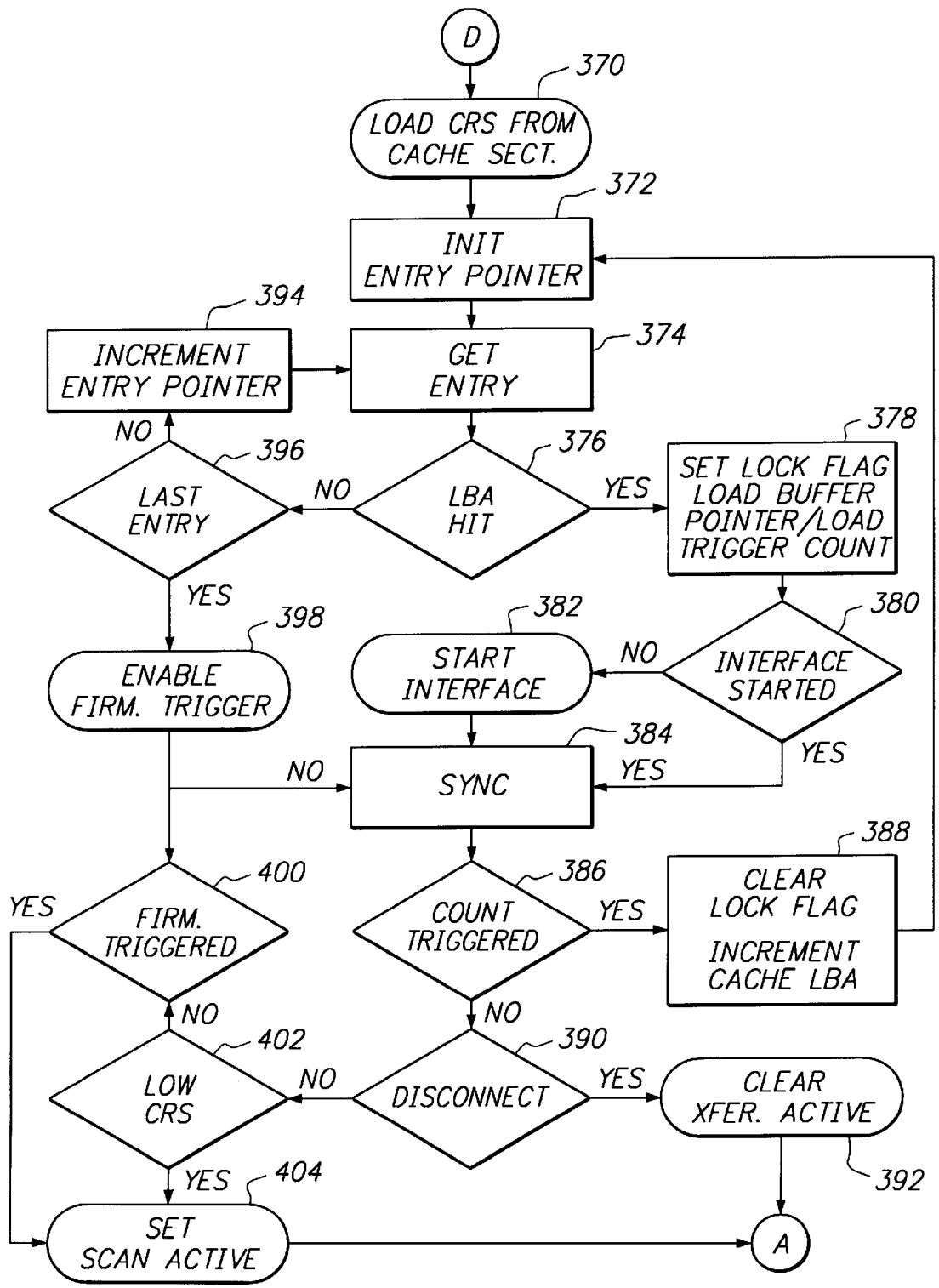

Referring to FIG. 9, when Transfer Active is posted and Scan Active is not, CSM 69 proceeds to step D. In this AT specific implementation, CSM 69 loads an AT interface specific register, Current Read Sectors (CRS), with the number of sectors available for transfer from the Cache Sector register at step 370. Cache Sector contains the number of sectors found during Scan, now to be transferred. CRS is an interface register for the amount of data for the interface to transfer.

To find the addresses of the aforementioned sectors in the Buffer, CSM 69 proceeds by initializing the Entry Pointer to the first entry of the Cache List at step 372, accesses that entry at step 374, and determines if the Cache LBA is identified in that entry at step 376, i.e. an LBA hit. If not a hit, CSM 69 determines if the entry is the last Cache List entry at step 396, and if not, increments the Entry Pointer to the next Cache List entry at step 394 and checks for an LBA hit again at step 376. When a hit is found, CSM 69 locks the entry Segment with the hit by setting the Lock Flag, loads the Buffer Pointer with the sector address of where the data is, and loads a Trigger Count register with the number of sectors to be transferred from the Segment at step 378. The sector address is computed based on the Segment address, its length, number of valid LBAs therein, and the current LBA, providing an offset for the sector in the Segment. CSM 69 then determines if the Interface has been started at step 380, and if not, CSM 69 starts the Interface at step 382, and synchronizes with the Interface at step 384 to transfers data from the sector pointed to by the Buffer Pointer based on the Trigger Count. With each sector transferred, the Interface decrements the Trigger Count. When the Trigger Count is zero as tested at step 386, all the data in the Segment has been transferred and the transfer for the next Segment with an LBA hit can begin.

To do so, CSM 69 again traverses the Cache List to find the next Segment and compute the next Buffer Pointer: CSM 69 clears the Lock Flag for the current Segment, and increments the Cache LBA at step 388 to the sum of the start LBA for the last transfer and the number of LBAs transferred. CSM 69 then proceeds to find the next Segment for transfer by traversing the Cache List at step 372. As such, CSM 69 seamlessly concatenates and transfers data from different Segments to the host.

In the worst case, CSM 69 traverses the Cache List beginning to end only once to find all the data to be transferred. This is because the amount of data to be transferred has already been determined in the previous full Scan and stored in CRS in step 370. In a full Scan, the Cache List may be fully traversed more than once since the Cache LBA is incremented as an LBA in sequence with the Start LBA of the new Command is found.

Back in step 386, if count is not triggered, and there is a disconnect or abort 390, CSM 69 stops the transfer by clearing Transfer Active at step 392 and proceeds to step A. Otherwise, for this AT interface specific implementation, for multiple commands, data is transferred in blocks of a block count value (e.g. four LBAs at a time). If CRS is lower than the block count, the Interface cannot transfer and generates a Low CRS signal as detected at step 402. In response, CSM 69 posts a Scan Active at step 404, and since Transfer Active has already been posted, CSM 69 proceeds to step A to Decode and perform another Scan for data not yet accounted for (e.g., data transferred to the cache while the last Transfer was taking place).

As such, CSM 69 transfers data out the Buffer so long as new data is fed into the Buffer. This is accomplished as follows: CM 67 initially loads the Running LBA with the Start LBA. CSM 69 then initializes the Cache LBA to the Running LBA in Decode. As data is transferred, the Running LBA is incremented to keep track. When CSM 69 begins Scan, it initializes the Cache LBA to the Running LBA, whereupon a Scan of the Cache List to the end of the New Command range is performed to find LBA hits. Thereafter, CSM 69 returns to Transfer and loads the CRS register as described above to begin transferring the data found during Scan. After the found data is transferred, CSM 69 again returns to Scan to find more data, and returns to Transfer to transfer the data out of the Buffer. The process continues and data is seamlessly transferred out of the Buffer so long as the request data is found in the Buffer.

Returning back to step 396, if CSM 69 determines that the entry is the last Cache List entry but the transfer is not complete, CSM 69 enables a firmware trigger mode at step 398 and loops in this step, waiting for firmware to set a trigger flag at step 400. When the trigger flag is set, CSM 69 posts a Scan Active at step 404 and proceeds to step A to perform another Scan. If, however, the trigger flag is not set, CSM 69 synchronizes with the interface at step 384 and proceeds as described above.

Cleanup

Figure 10:
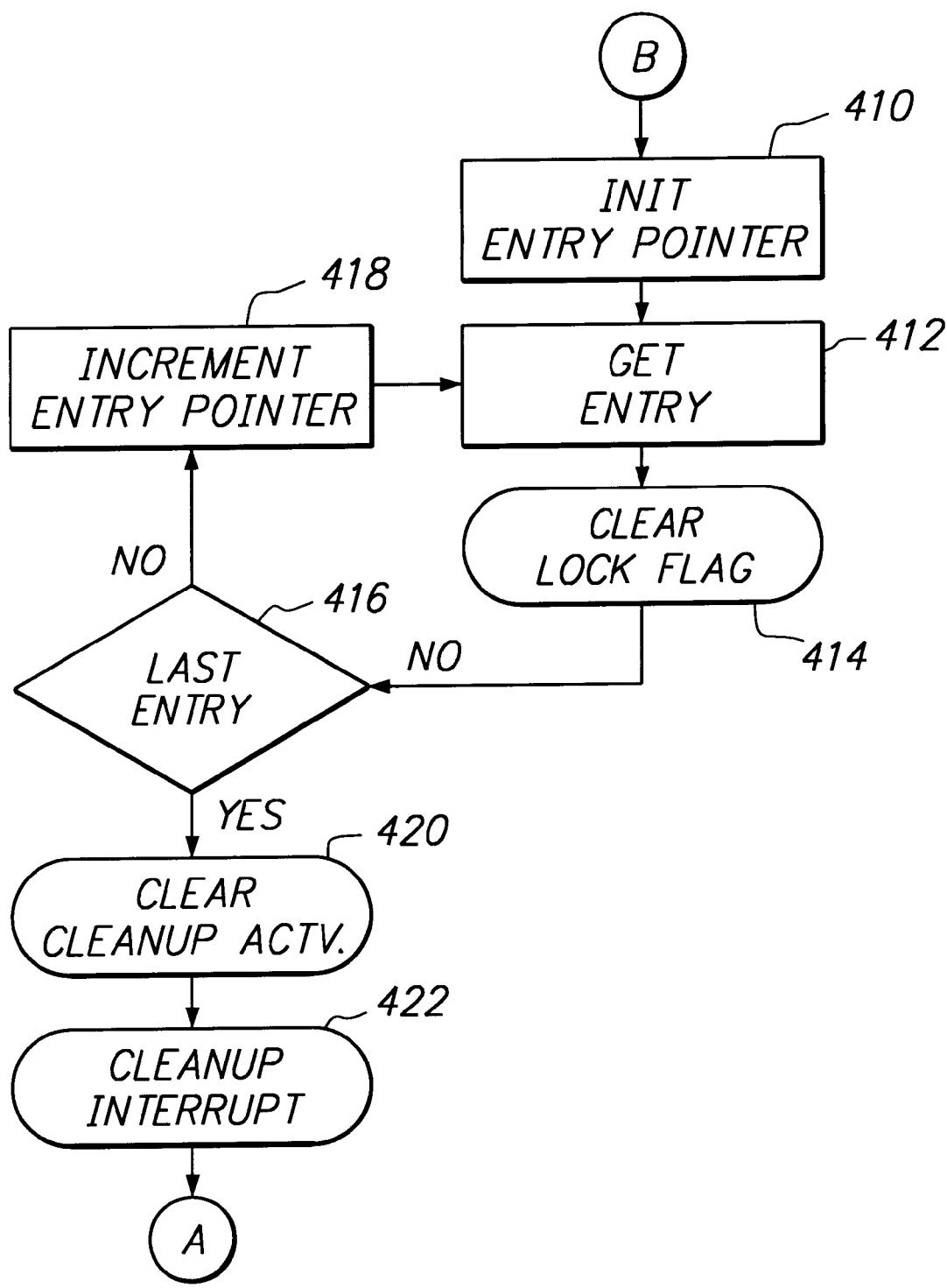

Referring to FIG. 10, when Cleanup Active is posted, CSM 69 proceeds to step B, and traverses the Cache List to ensure that all Segments locked during a Transfer are unlocked. This is because Transfer locks all the Segments with hits.

In steps 410–418 CSM 69 sequentially traverses the Cache List and clears the Lock Flag in every entry. Thereafter, CSM 69 clears the Cleanup Active at a step 420, generates a Cleanup Interrupt at a step 420, and proceeds to step A to Decode.

Mark

Figure 11:
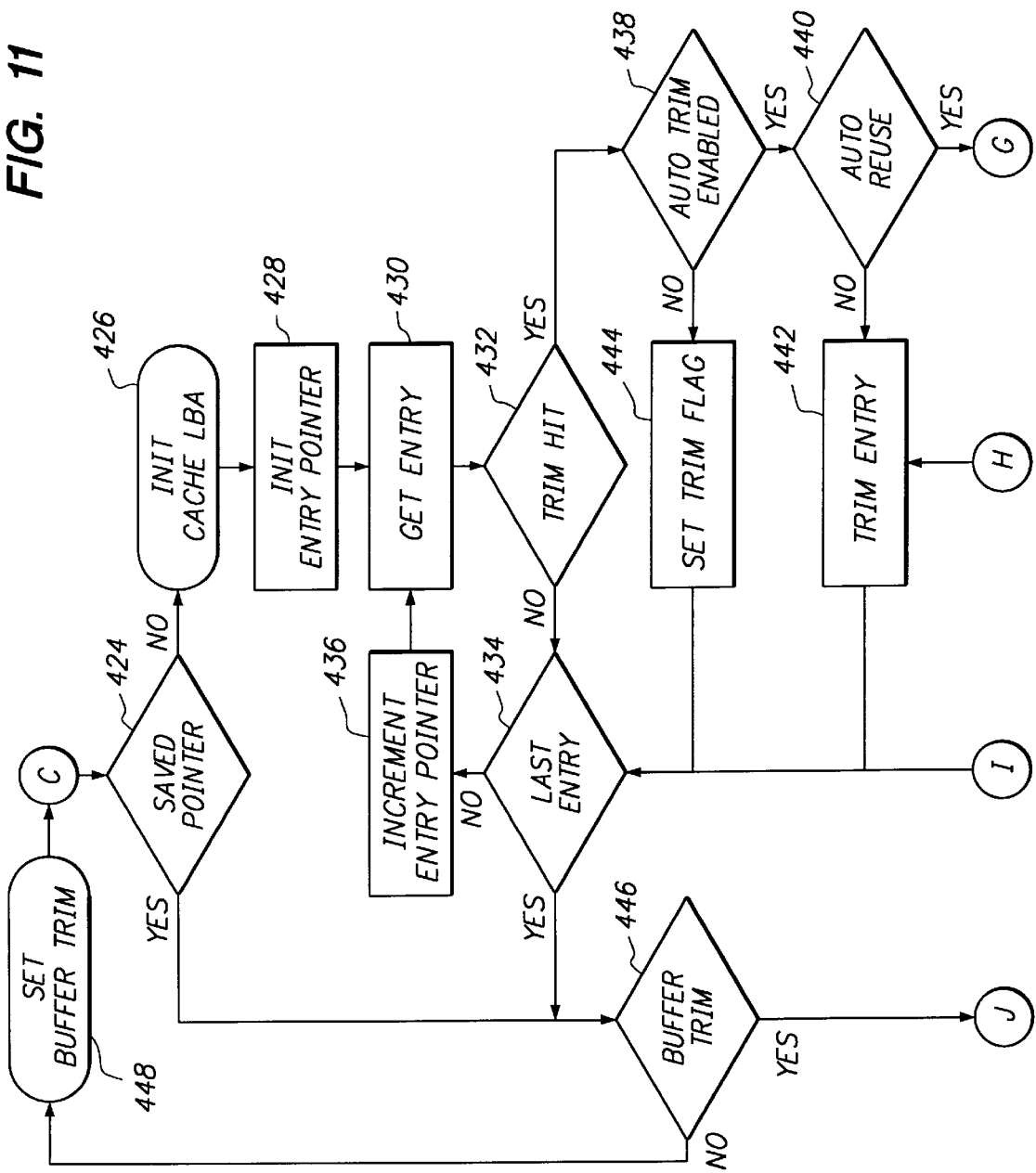

Referring to FIG. 11, when Mark Active is posted, CSM 69 proceeds to step C, where it ascertains both LBA and buffer overlaps. CSM 69 makes two passes through Mark, one for ascertaining LBA overlaps, and another for determining buffer overlaps.

In step 424, CSM 69 determines if a Saves Pointer to a Cache List entry exists, indicating a previous pass through Mark. If not, CSM 69 initializes the Cache LBA to the Running LBA, and initializes the Entry Pointer to the first entry of the Cache List at step 428. CSM 69 accesses the entry at step 430, and determines if the New Command LBA range overlap the current LBA set identified in the entry at step 432, i.e. a Trim Hit. If not a Trim Hit, and if the entry is not the last Cache List entry as tested at step 434, CSM 69 increments the Entry Pointer at step 436 and cycles to the next entry at step 430. If the current entry is the last entry at step 434, CSM 69 determines if the current pass through Mark is a buffer trim at step 446. If a buffer trim, Mark is complete and CSM 69 proceeds to step J to Allocate. If not a buffer trim, CSM 69 sets the Buffer Trim flag at step 448, and begins its second pass at step 424. The Cache LBA is initialized to a Buffer Pointer (not an LBA). Cache LBA is a generic register and its contents are interpreted based on the Buffer Trim flag. The same LBA hit steps are performed for the buffer to determine buffer overlap.

Back in step 432, if CSM 69 finds a Trim Hit, CSM then determines if Auto Trim is enabled at step 438, and if not, it sets the Trim Flag at step 444 for the entry to prevent the entire entry from participating in subsequent read Scans. The flag also indicates to the firmware that the entry has to be trimmed by the firmware. If Auto-Trim is enabled, CSM 69 determines if Auto Reuse is enabled at step 440, and if not, it trims the entry at step 442 by changing the values in the current Cache List entry to reflect the new Segment after trimming. Based on the type of trimming (LBA or buffer trimming), trimming includes changing one or more of: the Start LBA, reducing the number of Valid LBAs, changing the Buffer Pointer, or reducing Segment Size. After trimming, the entry describes a section of the buffer that includes valid data which can be used by Scan and Transfer. Back in step 483, if Auto Reuse is enabled, CSM 69 proceeds to step G to Reuse. When CSM 69 completes ascertaining both LBA and buffer overlaps, it determines if a buffer trim took place at step 446, and if so, it proceeds to step J to Allocate.

Reuse

Figure 12:
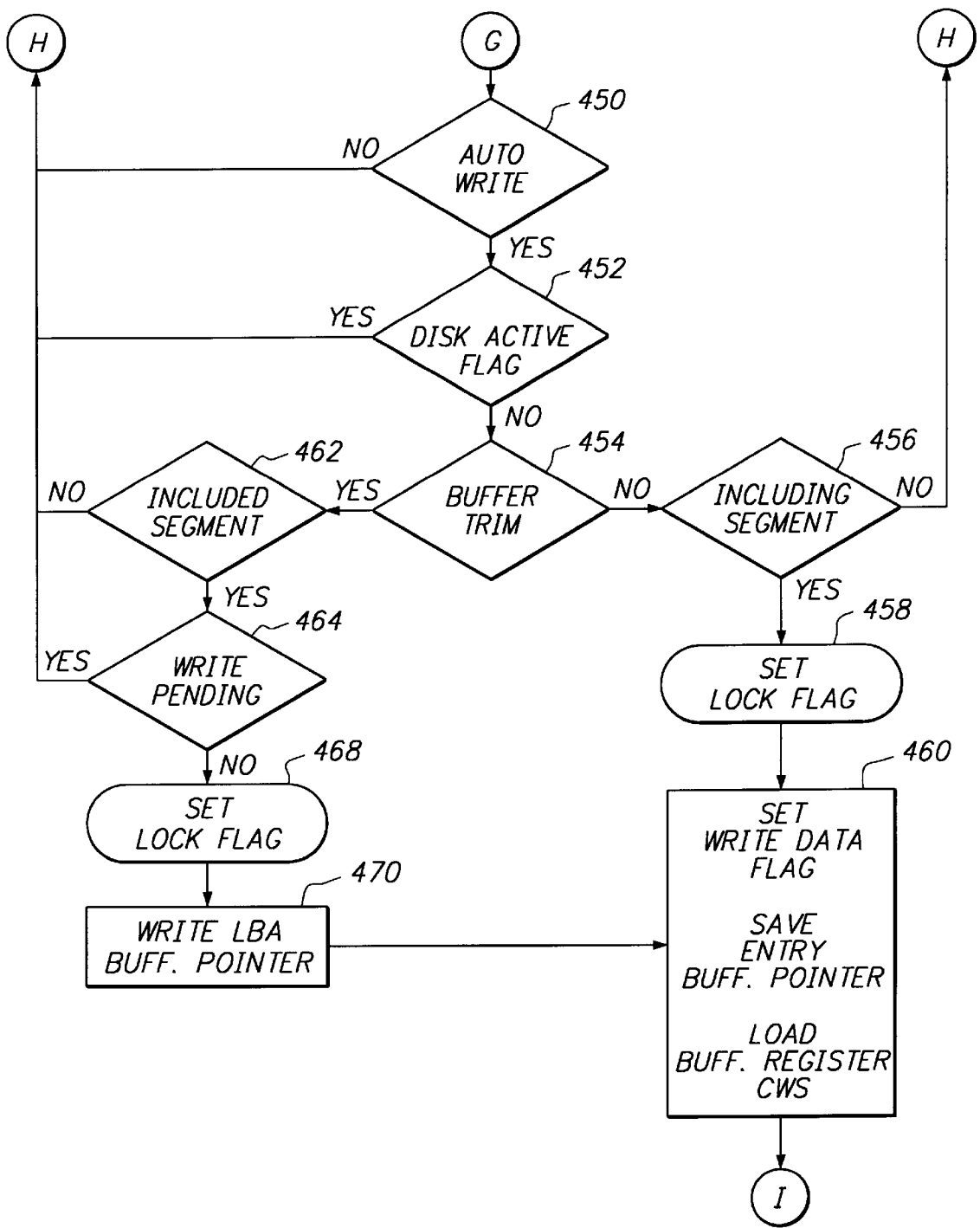

Referring to FIG. 12, when Auto Reuse is enabled, CSM 69 proceeds to step G, where it provides for full hit data in a write command to be transferred directly into position in the hit Segment, rather then to a position indicated by Auto-Write Pointer.

In step 450 CSM 69 determines if trimming has been requested by an Auto Write New Command at step 450 (not by the firmware). If not, CSM 69 proceeds to step H to trim the Segment and the data is placed in the Buffer location pointed to by the Auto-Write Pointer. Otherwise, CSM 69 determines if the Segment is being used by the disk drive at step 452. If so, CSM 69 proceeds to step H to trim the Segment and the data is placed in the Buffer location pointed to by the AutoWrite Pointer. Otherwise, CSM 69 determines the type of overlap trim at step 454. If LBA trim, CSM 69 determines if the Segment completely includes the New Command segment (full hit) at step 456. If not, CSM 69 proceeds to step H to trim the segment and the data is placed in the buffer location pointed to by the Auto-Write Pointer. If the Segment is an including segment, CSM 69 sets the Lock Flag for the Segment at step 458, and then: (1) sets the write data flag, (2) saves the entry Buffer Pointer back in the Command FIFO, replacing the Autowrite Pointer there with the Buffer Pointer which points to where the data will be stored in the Segment, and (3) provides the Buffer Pointer the transfer Interface by loading the Buffer Register and updating CWS with the amount of data to be transferred at step 460. CSM 69 then proceeds to step I for Marking, where the Buffer Pointer saved by Reuse is used by Mark at step 424.

Back at step 454, if the trimming is buffer trimming, CSM 69 determines if the current Segment is included in a new segment starting from the Auto-Write pointer at step 462

(i.e. the new segment beginning before the start of the current segment, and ending beyond the end of the current segment). If so, the entry becomes invalid and can be reused to describe the new segment created. To do so, CSM 69 sets Segment Lock Flag at step 468, and a new Start LBA and Buffer Pointer are placed in the entry at step 470. Thereafter, CSM 69 performs step 460 described above and proceeds to step I. The entry and the corresponding Buffer area are reused in both buffer trim and LBA trim cases.

Trimming an entry includes increasing or decreasing the number of Valid LBAs in the entry to resolve overlaps.

Allocation

Figure 13:
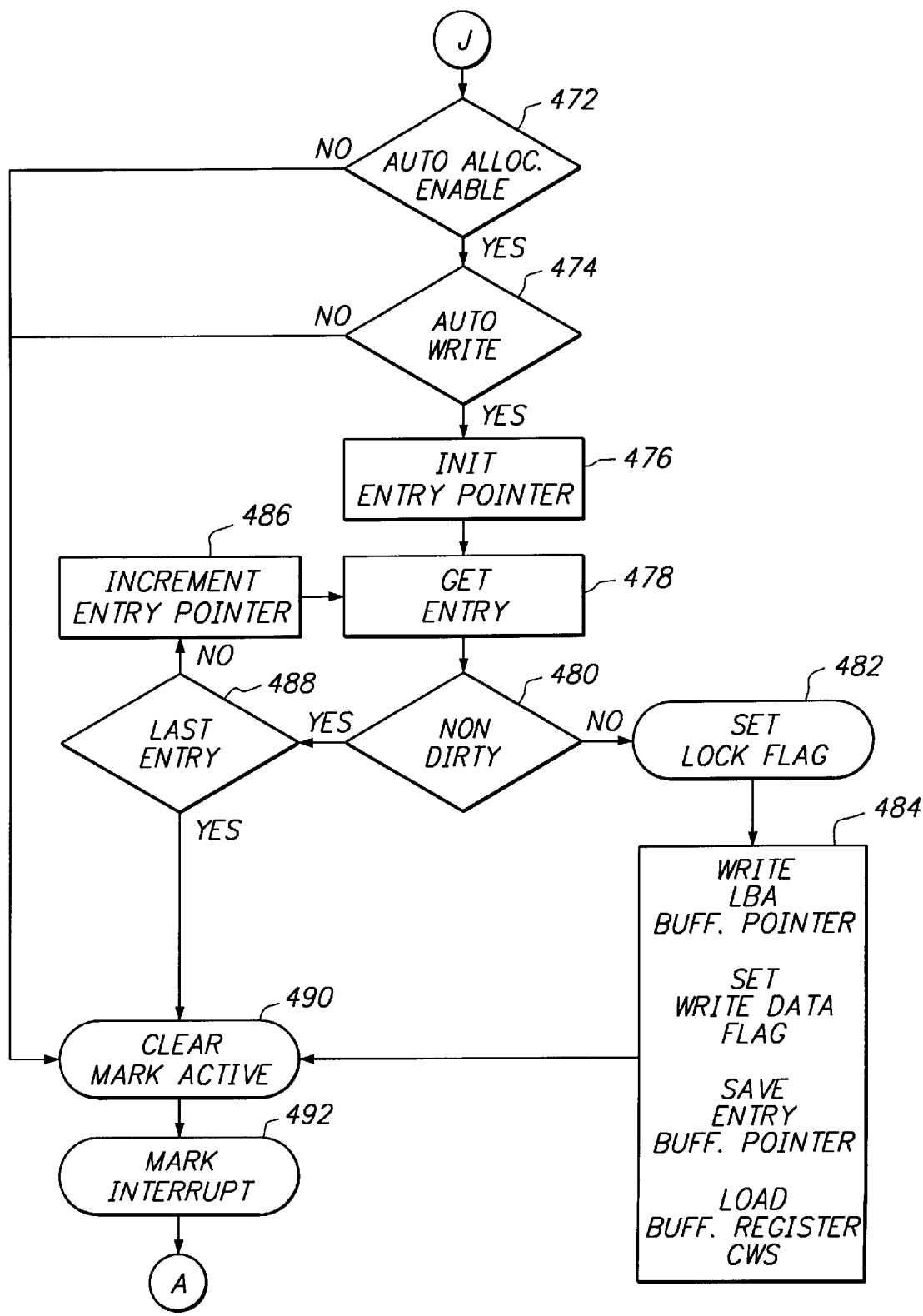

Referring to FIG. 13, CSM 69 proceeds to step G to look for an invalid Cache List entry to use as a new entry. In step 472, CSM 69 determines if Auto Allocation is enabled. If not, CSM 69 clears Mark Active at step 490, generates a Mark Interrupt for the firmware at step 492, and proceeds to step A to Decode. If Auto Allocation is enabled, CSM 69 determines if the New Command is Auto Write at step 474, indicating to the CSM 69 that it is not under firmware control. If the New Command is not Auto Write, CSM 69 clears Mark Active at step 490, generates a Mark Interrupt for the firmware at step 492, and proceeds to step A to Decode. If the New Command is Auto Write, CSM 69 begins searching the Cache List for all entries with Not Dirty bits set, indicating they are invalid. CSM initializes the Entry Pointer at step 476 to the first entry of the Cache List, accesses the entry at step 478, and determines if it is invalid at step 480. If the entry is invalid, CSM 69 proceeds to lock the entry at step 482, and allocate a segment by writing the LBA, writing the Buffer Pointer, setting the Write Data Flag, Saving the Entry back in the Command FIFO, and loading the Buffer Register and the CWS at step 484. This is an entry for the current write command. Therefore, subsequent reads may find hits in this segment and use the data therein. After allocating an invalid entry, or if CSM 69 reaches the last entry at step 488 without finding any invalid entries, it clears Mark Active 490, generates a Mark Interrupt for the firmware to know that marking has been performed at step 492, and proceeds to step A to decode.

In CSM 69 the Scan, Transfer and Cleanup operations are self-triggered. The firmware 60 can also place CSM 69 to any of CSM steps describe above. CSM 69 performs the action associated with the directed step, based on the values provided by the firmware in the Auto Enable Register. To ensure that the firmware and the CSM 69 do not compete, and the cache remains coherent, firmware disables CM 67 while CSM 69 is performing operations for the firmware.

Although in the above implementation, the cache list included 32 entries, other cache list sizes are also possible. The number of entries in the cache list can be selected to suit different performance criteria in a given system. For example, a cache list can include 4000 entries to keep track of 4000 LBAs in a 2-megabyte buffer. However, longer lists can require relatively more time to search. Further, the number of cache list entries can be less than the number of possible segments in the cache buffer. Due to locality of reference by the host, most data segments include a large number of consecutive data blocks. As such, the cache list need not reference all data segments to keep track of the data in use by the host. Traversing the cache list can include sequential search, binary search, or other search schemes known to those skilled in the art.

The present invention can be implemented as program instructions to be performed by a processor or to configure a logic circuit. The program instructions can be implemented in a high level programming language such as C, Pascal, etc. which is then compiled into object code and linked with object libraries as necessary to generate executable code for the processor. The program instructions can also be implemented in assembly language which is then assembled into object code and linked with object libraries as necessary to generate executable code.

Preferably, the controller 65 is implemented in a logic circuit configured by the program instructions to perform the steps described above. The logic circuit can be an Application Specific Integrated Circuit (ASIC). An ASIC is a device designed to perform a specific function as opposed to a device such as a microprocessor which can be programmed to performed a variety of functions. The circuitry for making the chip programmable is eliminated and only those logic functions needed for a particular application are incorporated. As a result, the ASIC has a lower unit cost and higher performance since the logic is implemented directly in a chip rather than using an instruction set requiring multiple clock cycles to execute. An ASIC is typically fabricated using CMOS technology with custom, standard cell, physical placement of logic (PPL), gate array, or field programmable gate array (FPGA) design methods.

A dedicated logic circuit, such as an ASIC, provides higher performance than a microprocessor since the logic is implemented directly in the chip rather than using an instruction set requiring multiple clock cycles to be executed by a microprocessor.

Figure 14:
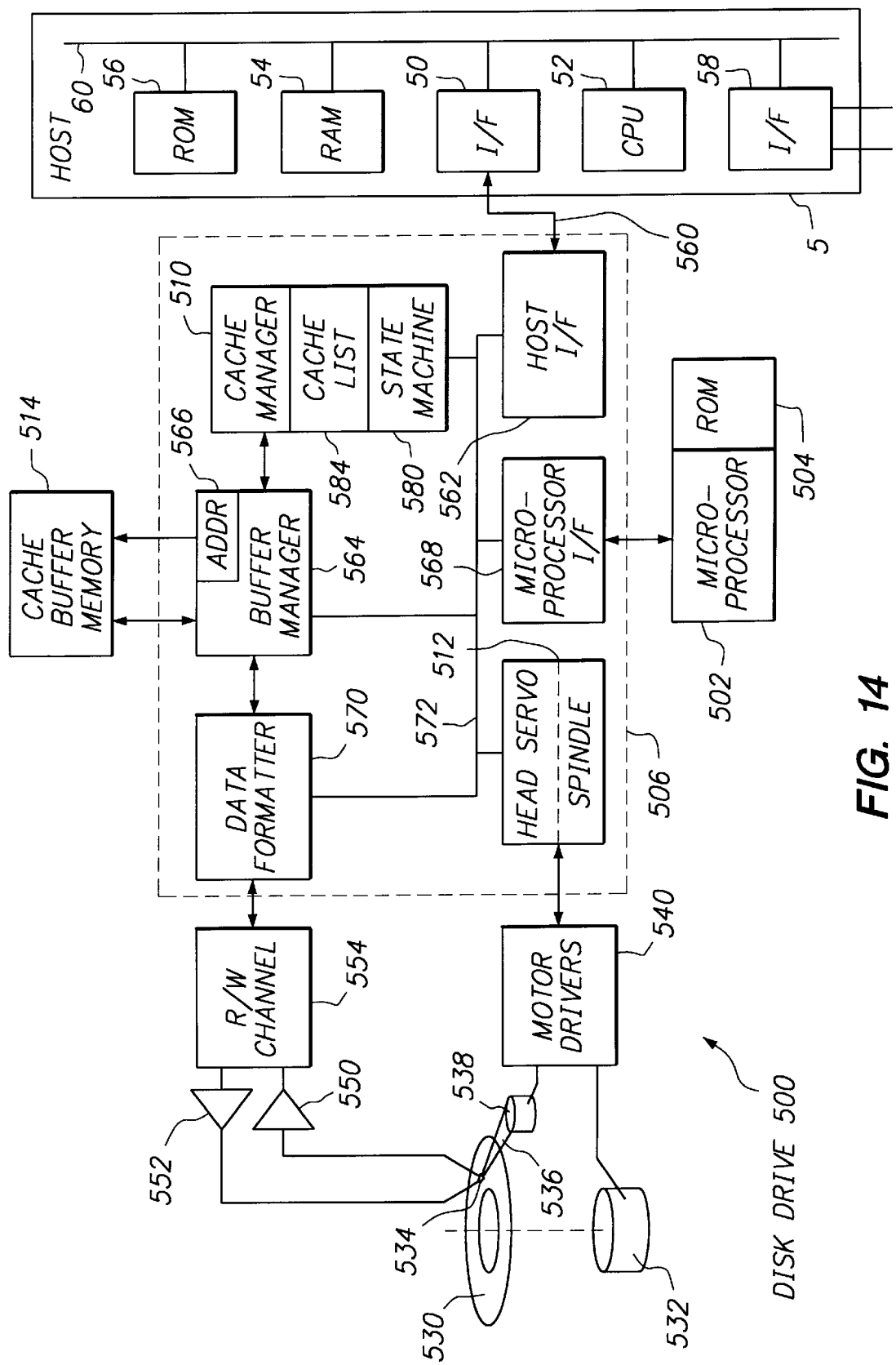
FIG. 14 is a block diagram of a host-connected hard disk drive including a cache controller having a single cache controller state machine in accordance with principles of the present invention.

Referring now to FIG. 14, an alternative preferred embodiment 510 of the controller logic circuit 65 can be embedded within a memory device, such as a hard disk drive 500 having at least one embedded microprocessor 502 and a ROM 504. The cache manager/controller 510 is preferably included within a disk drive multi-function controller chip 506. Typically, the ROM 504 includes data and program instructions to enable the microprocessor 502 to interact with a spindle motor/voice coil motor controller 512 in the disk drive, and to oversee transfer of data between a host and the disk drive through the disk drive 500. The disk drive 500 includes the cache buffer 514 for storing data into and retrieving data from the disk drive. The disk drive can also be used to store and maintain the cache list 80. Preferably, the cache list 80 is stored in a fast local memory 520 for efficient access by the cache controller 510.

The disk drive 500 also conventionally includes at least one rotating data storage disk 530 having a magnetic surface for storing user information in e.g. concentric data tracks. The disk 530 is rotated at a desired angular velocity by a spindle motor 532 controlled by the spindle motor controller 512. A data transducer head 534, including write and read elements, flies in close proximity to the data storage surface upon an air bearing. A head positioner 536 including e.g. a voice coil motor positions the head 534 at desired radial locations for random access to storage locations for writing/reading operations. A motor driver 540 supplies controlled driving currents to the spindle motor 532 and to the voice coil motor 538 of the head positioner 536. A read preamplifier 550 amplifies minute signals derived from the read element during data reading from disk, while a write driver 552 provides write current to the write element for data writing to the storage disk 530. A read/write channel 554 provides coding, decoding and signal processing in order to encode data for writing to disk and in order to recover data from magnetic flux transitions read from disk.

The disk multi-function chip 506, the buffer memory array 514, microprocessor 502, along with the read/write channel chip 554 and motor driver chip 540, comprise the principal discrete elements of drive electronics of the disk drive 500. A host bus 560 following a known convention such as AT (IDE), SCSI, or IEEE 1394, enables the disk drive 500 to be connected to the host interface 50.

The disk multi-function chip 506 includes several important functions including a host interface controller 562, a buffer manager 564 (including an address generator 566), the embedded cache manager 510 in accordance with principles of the present invention, a microcontroller interface 568, a disk data formatter/sequencer 570, and the spindle/head controller 512, all being internally connected within the chip 506 via an internal bus structure 572. The interface controller 562 connects to the host 50 via the bus structure 560. The buffer manager 564 connects to and controls the buffer memory array 514.

The formatter/sequencer 570 directly connects to the read/write channel chip 554. The spindle/head position controller 512 connects to the motor driver chip 540. The microcontroller interface 568 directly connects to the microprocessor 502. In some embodiments of the disk multi-function chip 506, a microcontroller core may be directly integrated within the silicon structure thereof instead of being a separate chip as shown in FIG. 14. In the FIG. 14 example, the drive-embedded cache system essentially comprises the buffer memory 514, the buffer manager 564 and address generator 566, the interface 562 and the embedded cache manager 510.

Also shown within FIG. 14 is the host computer 5. The host computer 5 includes the interface 50 connected to the bus 560. The interface 50 is necessarily compatible with the interface controller 562 of the disk drive as well as with the bus structure 560. The host 5 also conventionally includes a central processing unit 52, a random access memory array 54, a read only memory 56, and a plurality of input/output ports 58 enabling other peripherals such as keyboard, mouse, display, modem, network devices to be attached and used. An internal host bus structure 60 interconnects the CPU 52 with disk interface 50, RAM 54, ROM 56, and I/O 58.

Figure 15:
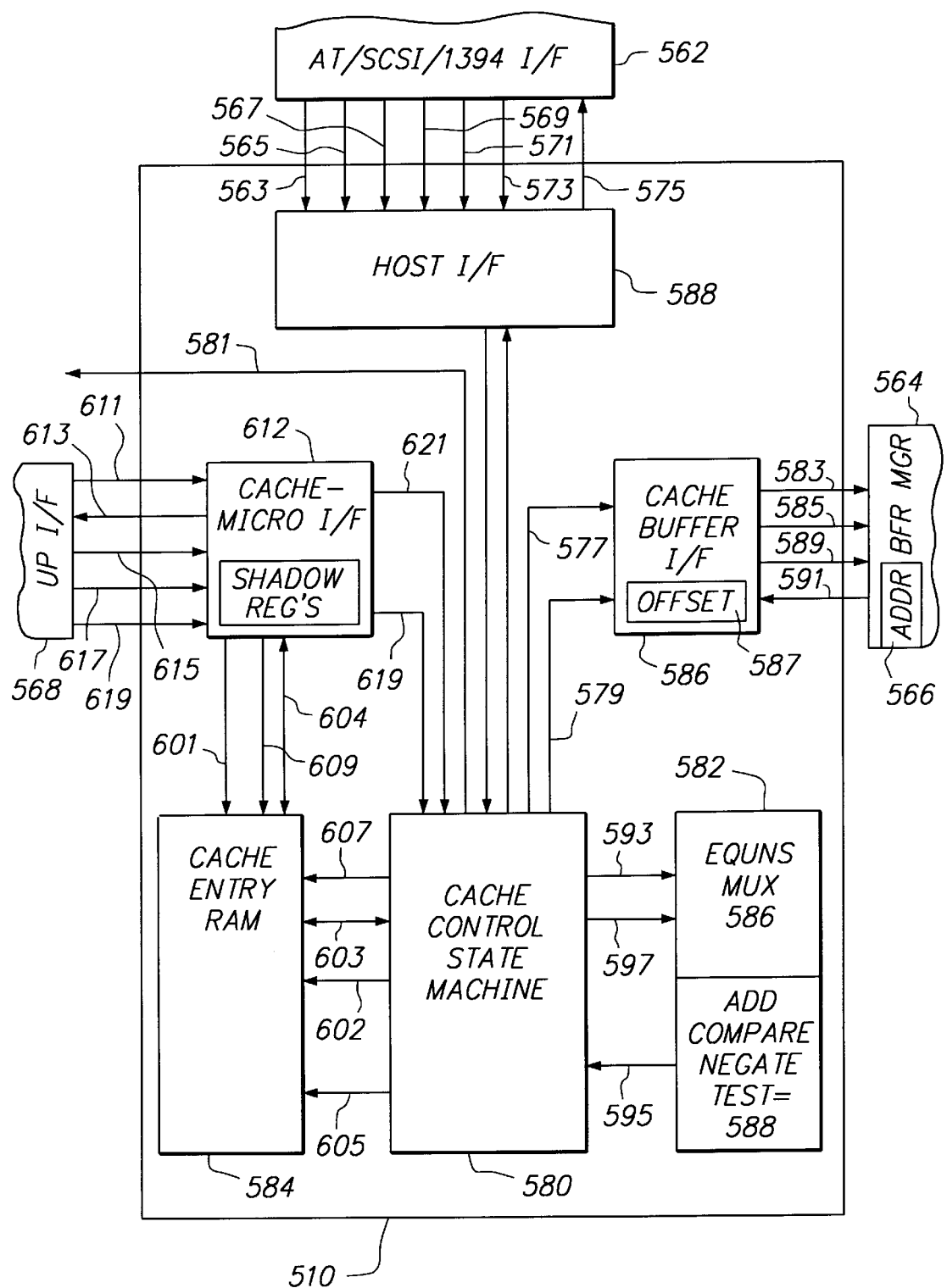
FIG. 15 is a more detailed block diagram of the cache controller of FIG. 14.

The embedded cache manager 510 is illustrated in greater detail in FIG. 15. Referring to FIG. 15, the embedded cache manager 510 of the present embodiment includes a single multi-state cache control state machine 580, an arithmetic/logic unit (ALU) 582 and the cache list RAM 584. The buffer manager interface 586 connects directly to the buffer manager 564 and includes a word offset block 587 which enables the cache controller 510 to control automatic addressing of multiple cache segments within the cache buffer memory array 514 without firmware intervention. A cache-host interface 588 directly interfaces with the host interface controller 562. A cache microprocessor interface 612 includes a bank of firmware shadow registers which are written to and read by the microprocessor 502 via microprocessor interface 568 enable firmware and the cache controller 510 to coordinate respective cache management activities. Shadow registers enable the microprocessor 502 to write entries directly to the cache list RAM 584. The cache microprocessor interface 612 provides control and status handshaking between the microprocessor 502 and the cache controller state machine 580. Shadow registers are most preferably provided for valid LBA, start LBA low, start LBA high, segment size, buffer pointer, LBA offset, and flags fields of the cache entries, see FIG. 17, discussed below.

A series of data paths and control lines are shown interconnecting the functional blocks of FIG. 15. A series of paths extend between the host interface controller 562 and the cache-host interface block 588. These paths include a scan request line 563, a read/write control line 565, a path 567 providing command LBA and sector count information, a sector start control line 569, a sectorsavailable path 571, a transfer done line 573, and a path 575 providing sectorsavailable, load-sector control, buffer pointer/entry, and flags information to the host.

A path 577 sends a zero trigger count value from the cache controller state machine 580 to the cache buffer interface 586. A path 579 provides rollover and reload values from the cache controller state machine 580 to the cache buffer interface 586. A firmware interrupt control line 581 from the cache controller state machine 580 causes regular program execution by the microprocessor 502 to be interrupted in order to provide data transfer operations under firmware control whenever a cache miss, or partial cache hit is detected by the cache controller 510.

A path 583 sends end of cache segment information from the cache-buffer interface 586 to the buffer manager 564. A path 585 sends a buffer load, buffer reload control signal from the cache-buffer interface 586 to the buffer manager 564. A path 589 sends a cache segment starting address to the address generator 566 of the cache buffer manager 564. A path 591 returns a buffer address write pointer address from the buffer manager 564 to the cache-buffer interface block 586.

A state values path 593 extends from the cache controller state machine 580 to the ALU 582 and a results path 595 extends from the ALU to the state machine 580. A multiplexer control path 597 also extends from the cache state machine 580 to the ALU 582.

A shadow address path 601 extends from the cache-microprocessor interface 612 to the cache list RAM 584. A cache list entry address path 602 extends from the cache state machine 580 to the cache list RAM 584. A bi-directional cache entry data path 603 extends between the cache list RAM 584 and the cache state machine 580, while a bi-directional firmware cache entry data path 604 extends between the cache-microprocessor interface 612 and the cache list RAM 584. A firmware access control line 605 extends from the cache state machine 580 to control an address multiplexer 610 of the cache list RAM 584, while a state machine write control line 607 and a shadow write control line 609 extend respectively from the state machine 580 and the cache-microprocessor interface 612. These latter two control lines control data multiplexers 606 and 608 within the cache list RAM 584. Only two multiplexers 606 and 608 are explicitly shown in FIG. 17. In practice, each field of the cache list has a separate multiplexer enabling that particular field selectively to be written and read.

A cache control line 611 extends from the microprocessor interface 568 to the cache-microprocessor interface 612. A cache-microprocessor read data path 613 extends oppositely, from the cache-microprocessor interface 612 to the microprocessor interface 568. A write strobe control line 615, a microprocessor write data path 617, and an address path 619 also extend from the microprocessor interface 568 to the cache-microprocessor interface 612.

Figure 16:
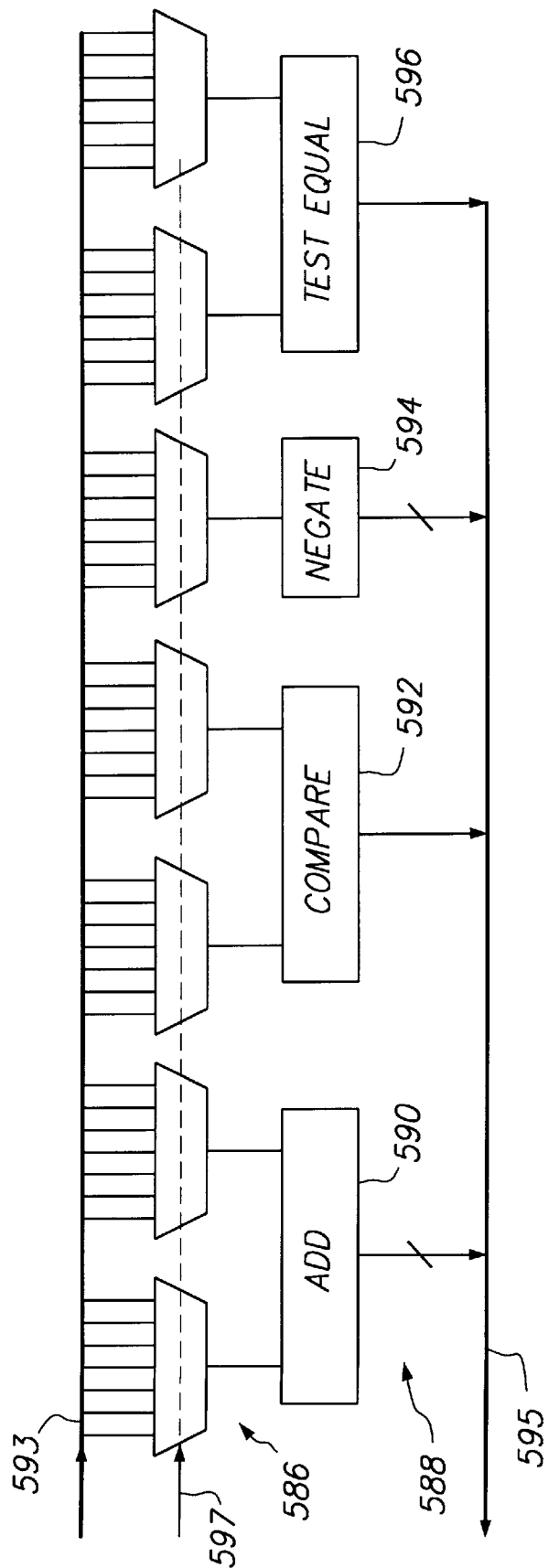
FIG. 16 is a more detailed block diagram of a dedicated arithmetic logic unit of the FIG. 15 cache controller.

The ALU 582, shown in greater structural detail in FIG. 16, includes an equations setup block 586 which comprises a series of multiplexers controlled by control signals on path 597 thereby enabling various combinations of values on path 593 to be set up for simultaneous arithmetic/logical operations carried out by a functions unit 588. Essentially, the functions unit 588 includes an addition function 590 which performs an addition function upon two values, a comparison unit 592 which compares two values to determine which is larger, a negation unit 594 which returns a negative function of a value, and a test-equal unit 596 which determines if two values are equal. The comparison unit 592 and the equivalency determination unit 596 put out single bit results, whereas the addition unit 590 and the negation unit 594 put out multi-bit results. These results are returned to the cache state machine 580 via path 595.

All of the arithmetic/logic functions of a particular step or act are carried out simultaneously within a single clock cycle of the state machine 580, so that the state machine 580 operates very quickly in managing the cache. A local cache list is stored in the cache table RAM 584 and this cache list is directly accessed by the cache control state machine 580 and contains information concerning the user data blocks presently in segments of the cache buffer memory 514.

Figure 17:
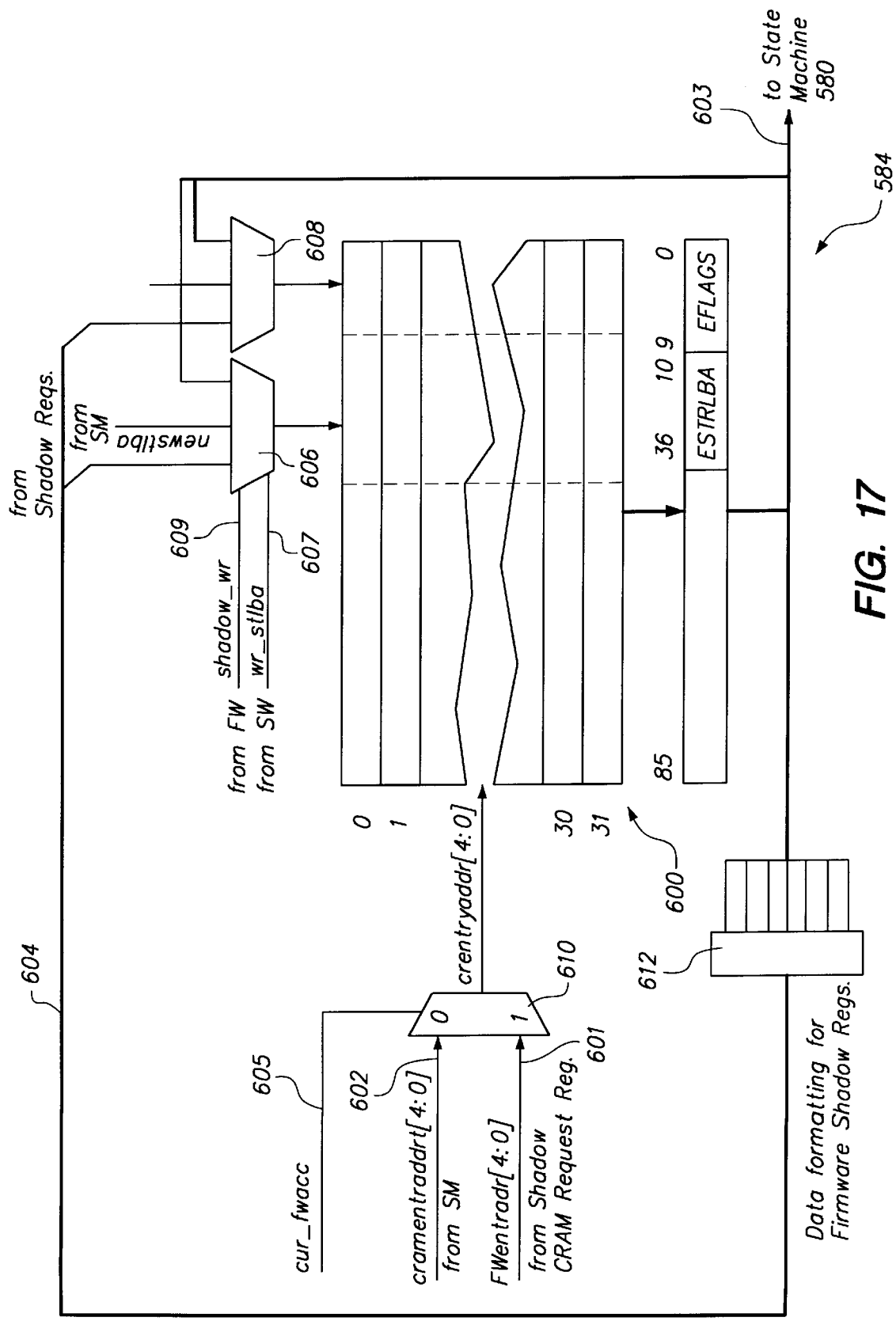
FIG. 17 is a more detailed block diagram of a cache list random access memory unit of the FIG. 15 cache controller.

The cache entry RAM 584, depicted in FIG. 17, is organized in the drive multi-function chip 506 as a 32 entries by 86 bit random access memory array 600 having two address ports 601 and 602, and a data path 603. The data path 603 selectively writes a table entry via a series of data multiplexers, including a starting LBA field data multiplexer 606, and a flag field multiplexer 608 (the other field multiplexers not being shown in FIG. 17). An address multiplexer 610 selects between the two address ports 601 and 602. The shadow registers of block 612 are written and read by the microprocessor 502 under drive firmware control.

Each single cache entry data word has a width (86 bits) sufficient to contain all of the fields needed for a particular cache entry. These fields most preferably include: starting LBA [26:0] which represents the starting LBA for the cache entry; valid LBA [11:0] which describes how many LBAs are valid for this particular entry; buffer pointer offset [11:0] which points to the beginning of the corresponding segment in the cache buffer 514 and is defined in terms of sector size; segment size [11:0] which indicates the size of the present cache entry in terms of sector size and which must be greater than the valid LBA field value; LBA offset [11:0] which is the address offset from the beginning of the buffer segment of the starting LBA of the present entry; and a cache entry flags field [9:0].

The cache entry flags [9:0] are most preferably defined as follows:

[9] Reserved;

[8] available to indicate firmware update—cache entry is currently being accessed by drive firmware;

[7] video data—set and cleared by firmware, the present cache entry is good only for video reads; the cache controller 510 ignores this entry for regular reads during read transfer;

[6] disk active—this flag is set when the disk firmware is presently using this cache entry, either for a disk read or write and cleared by firmware following completion of the disk activity; if during a write transfer this flag is set and an overlap is determined to exist, the cache controller 510 will set the mark flag; during read transfer the cache controller 510 can use this entry for a read scan (i.e. sector prefetch is active and the read command is sequential);

[5] write pending—the cache entry is pending a write to disk; this flag is set by the cache controller 510 when the cached data needs to be written to disk, and is cleared by the drive firmware following writing to disk; if the write pending flag is set and there is an overlap, during a write transfer the cache controller 510 may trim the entry during LBA scan but never during buffer scan;

[4] release interrupt—this flag is set when drive firmware wants to access an entry locked by the cache controller 510; when the cache controller 510 has finished with this cache list entry, it clears this flag and generates a firmware interrupt which notifies the disk firmware that the entry may now be accessed;

[3] unavailable—when this flag is set, the present cache entry is unavailable to the cache controller 510; this flag is set by the drive firmware when it is creating a new cache entry; following completion of the new entry, the firmware clears this flag;

[2] valid—this cache entry is presently valid; this flag may be set and cleared by both the cache controller 510 and by the disk firmware; if the valid bit is set, the cache controller 510 will check it for a cache hit or miss during cache list scan; if the valid flag is not set during write transfer, the cache controller 510 will use the entry for a new write and if the entire entry is overlapped with a current write, then the cache controller 510 will clear the valid flag;

[1] mark—set by the cache controller 510, this flag denotes that the present cache entry needs cache trimming; if this flag is set, then the cache controller 510 will ignore this cache list entry during read transfer; this flag is cleared by the disk firmware after it synchronizes this entry with the latest write data by trimming the entry;

[0] locked—this flag is set by the cache controller 510 which presently needs this cache entry for cache reads thereby preventing firmware from overwriting this entry;

The host interface block 562 receives commands from the host computer 5 and signals the cache controller 510 to perform a cache scan. The information received by the cache controller 510 includes a logical block address (LBA) of a starting block (sector), a number of sectors to be transferred, and whether the new command is read or write. For a host data read command, the cache controller 510 scans the cache list maintained in cache RAM 584 for a hit and monitors the transfer of hits across multiple cache segments and/or for partial cache hits. For a host data write command the cache controller 510 scans for any overlap between current cache buffer data and write data, and takes appropriate action.

Host Read Command

Figure 18:
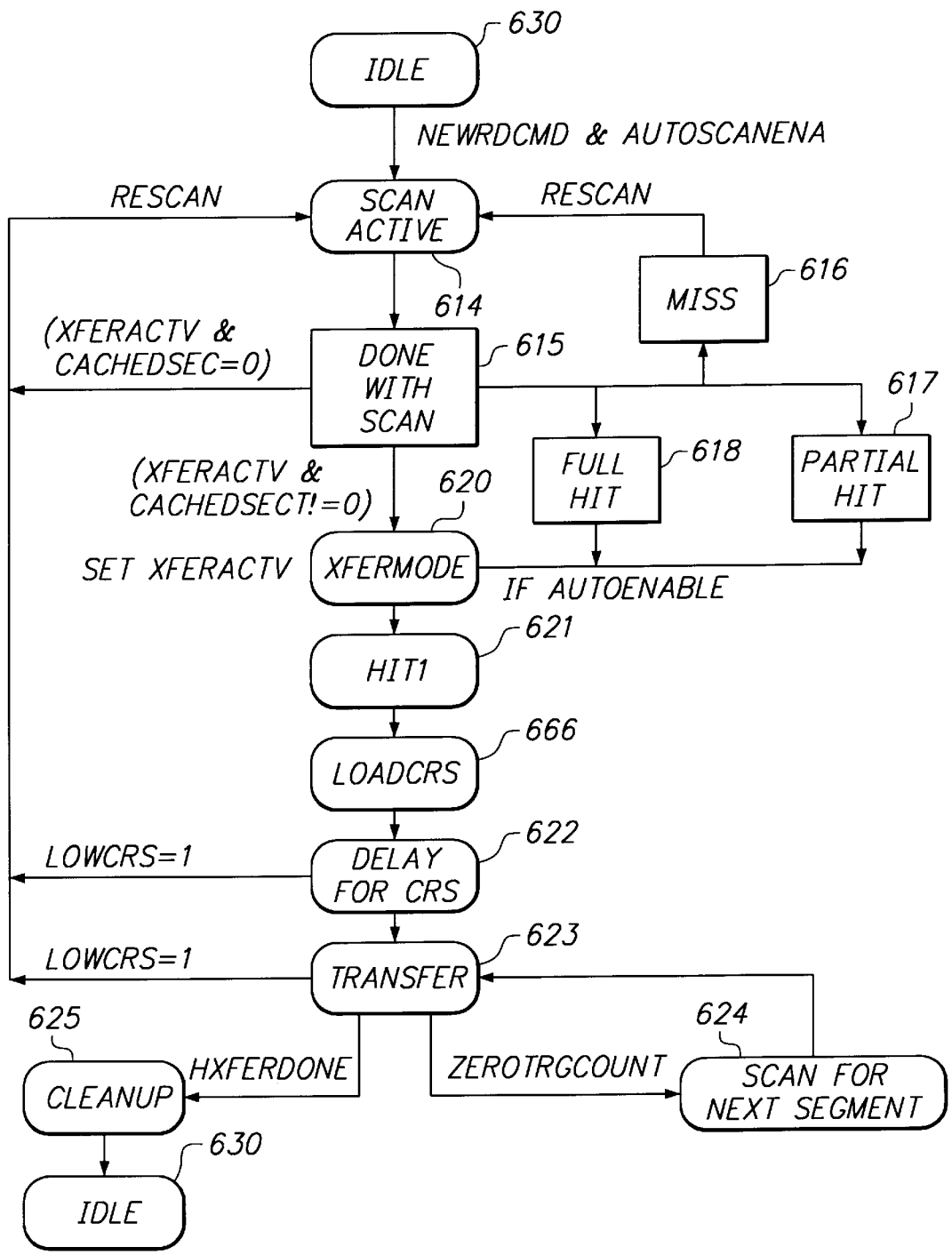
FIG. 18 is a state flow diagram of an overall cache read process carried out by the FIG. 15 cache controller.
Figure 18A:
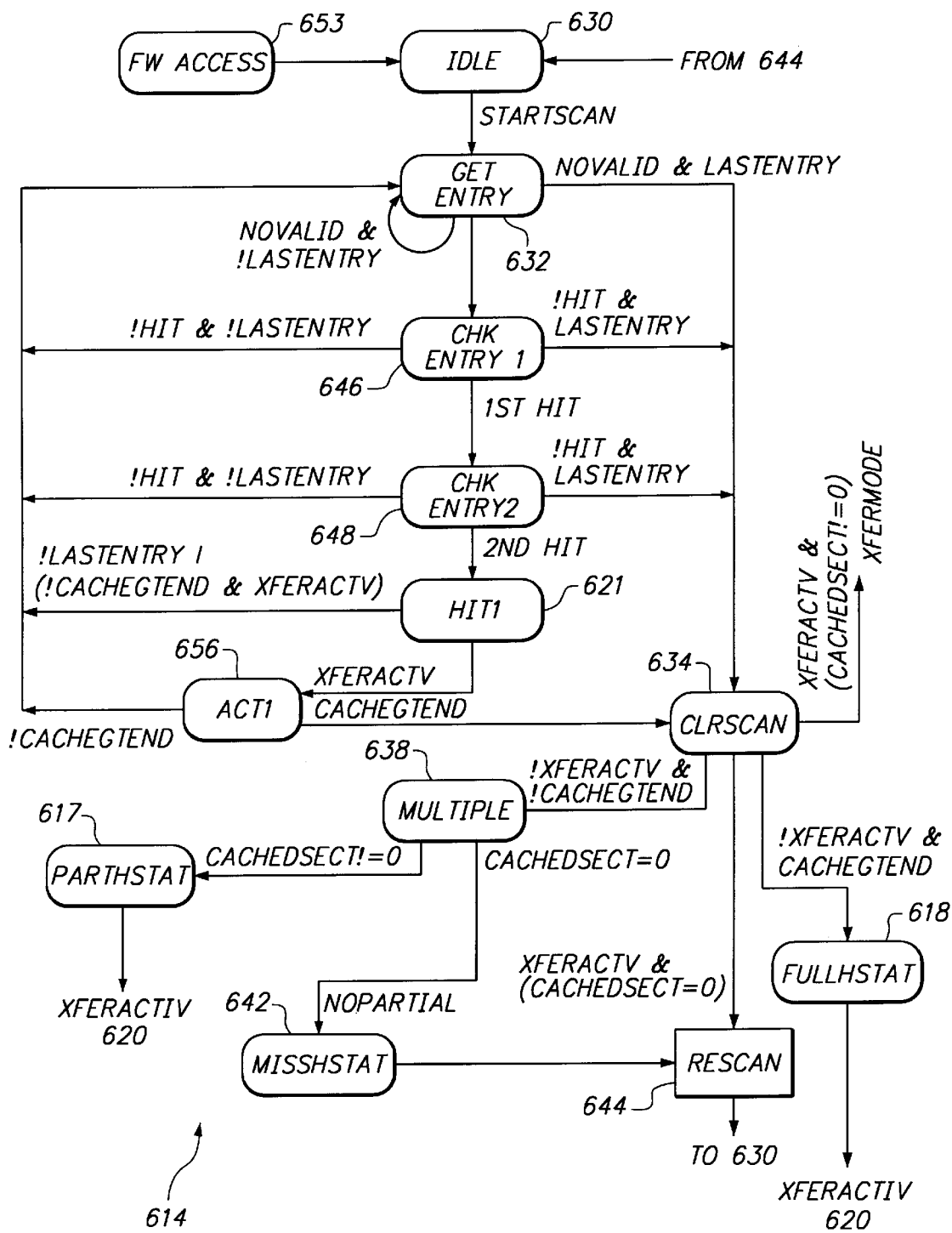
FIG. 18A is a state flow diagram of a cache read scan operation of the FIG. 15 cache controller state machine within the overall cache read process flow of FIG. 18.

Referring now to FIG. 18, upon receiving a read command from the host interface 562, the cache controller 510 leaves an idle state 630 and enters a scan active process 614. The scan active process 614 follows a process flow outlined in detail in FIG. 18A. The scan process continues to scan the cache table entries until all of the entries have been considered. During a first scan, no transfer to host is occurring (transfer_active is negated or !xferactv). When the scan active process 614 of FIG. 18A is complete, a done with scan action 615 is reached in the FIG. 18 process flow. If transfer_active is then true and the number of cached sectors is zero, a return is made to the scan active state 614 and its process flow is repeated. If transfer_active is then false, the scan active process 614 has determined a cache miss and action 616 is reached which causes process flow to return to the scan active state 614. Also, following a first scan with zero hits, the sectors available register is loaded with zero.

If a cache partial hit 617 or a cache full hit 618 is determined, and an automatic transfer enable control is true, then the FIG. 18 cache read process flow progresses to a transfer mode 620 where transfer_active is set true. The transfer mode 620 is set forth in greater detail in FIG. 19 and includes a number of the same states reached by the cache controller state machine 580 during the scan active mode 614 outlined in FIG. 18A. Transfer mode 620 progresses to a first hit state 621 at which requested sectors have been located in cache. A state 666 is then reached which causes the number of sectors found in cache to be loaded into a host-accessible register. This cached sectors found register accessible by the host is loaded with pointers to the sectors available for transfer.

A delay step 622 is then reached which imposes a delay while the host determines whether the number of sectors now ready for transfer from cache (CRS) meets a minimum multi-block transfer requirement (e.g. 2–256 sectors) of the host. If the number of available sectors is above a minimum number, a transfer state 623 is reached which causes the sectors found in cache to be sent to the host. If trigger count (trgcount), a value representing the number of sectors available for transfer in a particular cache table entry, reaches zero, a scan for a next segment process 624 is reached and a return is made to the transfer state 623. This process of rescanning and transferring continues until the transfer of all of the requested sectors is completed. At the same time, firmware causes the disk drive to read additional sectors from disk into the cache buffer, and these additional sectors are located during rescanning and are thereupon automatically transferred to the host.

If a low sectors available signal is received from the host, meaning that either the read process is currently transferring the last sector found, or for a multiple-sector transfer the last sector of a block is currently being transferred and the cache does not have enough additional sectors to transfer the next block, as tested at either state 622 or 623, a return is made to the scan active process 614 of FIG. 18A in order to locate the remaining sectors needed to complete a hostrequested transfer. When the transfer of requested sectors to the host is completed, a read cleanup process 625 is reached, followed by a return to the idle state 630.

The scan active process 614 graphed in FIG. 18A begins with scanning the cache list for any entries that contain the read command LBA. Each cache list entry is obtained by the state machine 580 and tested for "valid" at step 632. If the entry is valid, states 646 and 648 test the entry against the LBA requested by the host. If the present cache list entry is not valid or does not include an LBA matching the requested LBA, the state machine 580 loops back to step 632 until the last entry is checked. If the last entry does not include a matching LBA, a clear-scan state 634 is reached.

When the scan is completed at state 634, the cache controller 510 may interrupt the drive firmware (drive firmware is executed by microprocessor 502); and, depending upon whether the scan results in a full cache hit, a partial cache hit, or a cache miss, the cache controller 510 may then enter a transfer mode in which the cache controller 510 starts a data transfer between the cache buffer 514 and the host 5, as by automatically loading a buffer starting address into the buffer manager 564 and informing the host of the number of valid sectors requested by the host which are present in the cache buffer 514.

Following the clear scan state 634 the cache state machine 510 proceeds either to the full-hit process 618 when the number of blocks found in the cache exceeds the end of the requested set (cachegtend), which denotes a full cache hit, or a multiple state 638, which is reached in the event that the LBA of the last requested sector is not found within any entry of the cache list. If the number of requested sectors found in cache during the scan is greater than zero, the partial hit process 617 is reached, and the cache state machine 580 proceeds to the read transfer active process 620 set forth in the FIG. 19 process flow diagram. On the other hand, if the number of requested sectors equals zero, meaning no sectors were found during cache scan, a cache-miss state 642 is reached, followed by a rescan process 644 which essentially causes a return to idle and a scan through all of the cache list entries again, since no requested entries have yet been located. Also, if during transfer active if the clear scan state 634 is reached, and the number of cached sectors equals zero, the state machine 580 proceeds directly to rescan 644.

Once a valid entry is located among entries of the cache list at step 632, states 646 and 648 are needed to check to determine if a particular cache entry is a hit. State 646 determines if the search logical block address (LBA) is greater than or equal to the cache entry start (ES), while state 648 determines whether the cache entry end (EE) is greater than the search LBA. Once states 646 and 648 are passed, the hit1 state 621 is reached. State 621 adds the number of additional sectors found during the present scan to the current total of sectors available for transfer to the host. If transfer is active, flow proceeds from hit state 621 to an ACT1 state 656. ACT1 state 656 determines if the cache segment including the cache hit is longer than the last LBA of the sought-after sequence to be transferred. If so, all of the requested sectors have been found, and the clear scan state 634 is reached. However, if the cache segment is not greater than the last LBA of the sought-after sequence of sectors, then a rescan via scan active 614 will be made to find any additionally requested sectors in the cache. This rescan process automatically permits the firmware to retrieve any missing sector(s) from disk and store them in the cache buffer, and update the cache list entry table.

In the FIG. 18A flow process, if a sector is not the end-of-sequence sector, a return is made to the get entry state 632, and read scanning is resumed. Also, if at states 646 or 648 it is determined that there is no hit, and it is not the last entry, the firmware call state 653 may be reached. Further, if at the hit state 621 it is determined that there it is not the last entry, or the number of blocks found in the cache is not greater than the end and transfer is active, the get entry state 632 is reached and a rescan begins. If, at the clear scan state 634, it is determined that the number of blocks in cache is greater than the end, then the full hit state 618 is reached if transfer_active is false. If transfer_active is true as tested at the clear scan state 634, transfer mode is entered if the number of cached sectors is greater than zero. Otherwise, a rescan occurs.

The firmware access state 653 is an optional state at which the firmware can access to read a cache table entry or to modify a cache table entry. In order for the firmware to do so it sends a firmware cache table (CRAM) request. The cache controller state machine 580 will detect a pending firmware request when the state machine goes to the next CRAM entry and will thereupon enter state 653 for one cycle during which the firmware request for access will be serviced.

Figure 19:
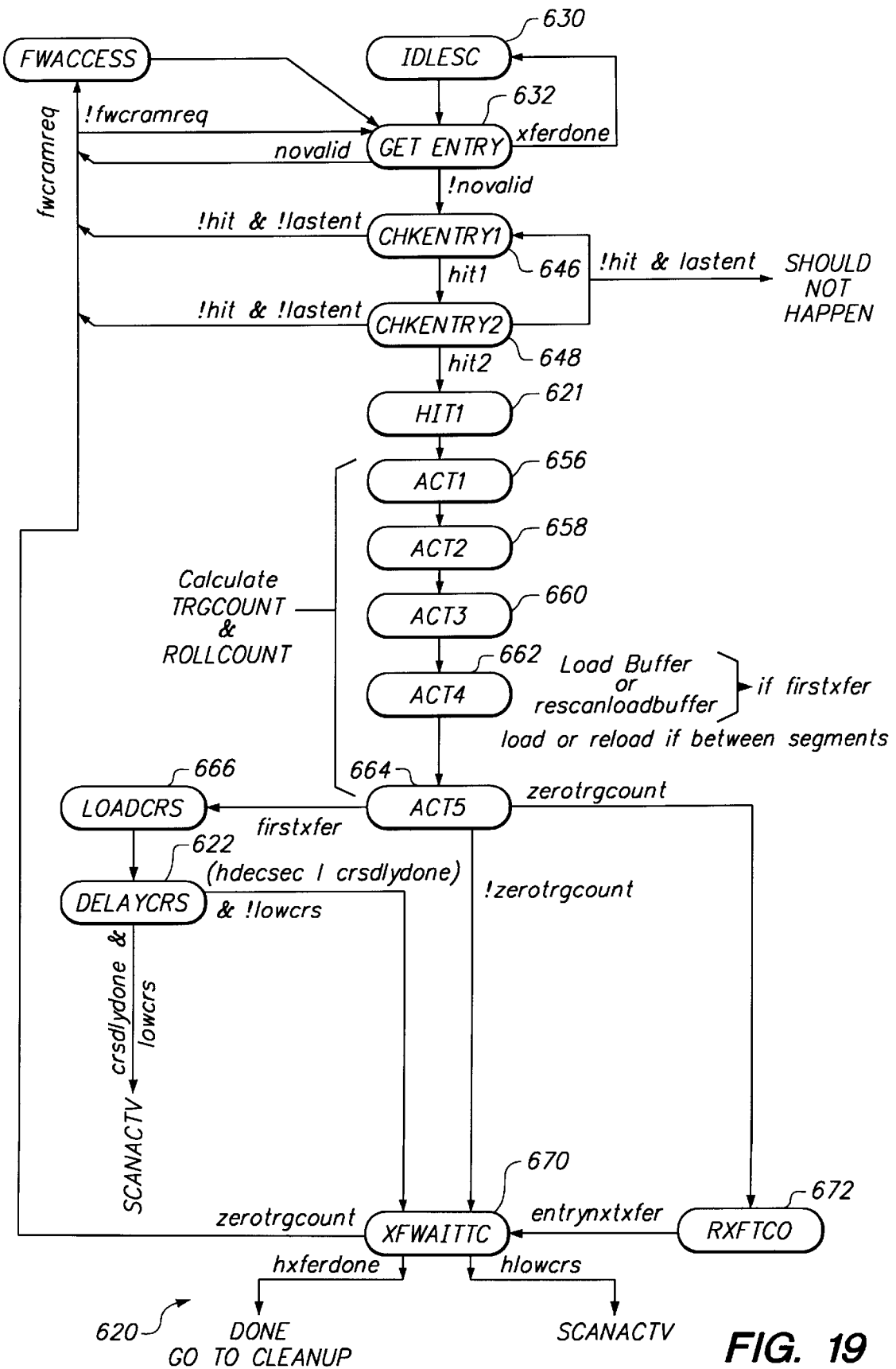
FIG. 19 is a state flow diagram of a cache read transfer process of the FIG. 15 cache controller state machine.

If the number of valid sectors available in the cache buffer 514 matches or exceeds the starting LBA and sector count, the host 5 will negate a low_sectors_available signal via path 571, and this action causes the cache controller 510 to remain in the data transfer mode. In FIG. 19 the state machine 580 enters the data transfer mode at the get entry state 632 which gets the first cache list entry marking as valid a requested sector. The cache entry is again checked at steps 646 and 648 to determine whether a particular entry is a hit. If no valid entry is found at state 632, or if there is no hit and the entry is not the last, as tested at states 646 and 648, a return is then made to the get entry state 632.

Figure 20A:
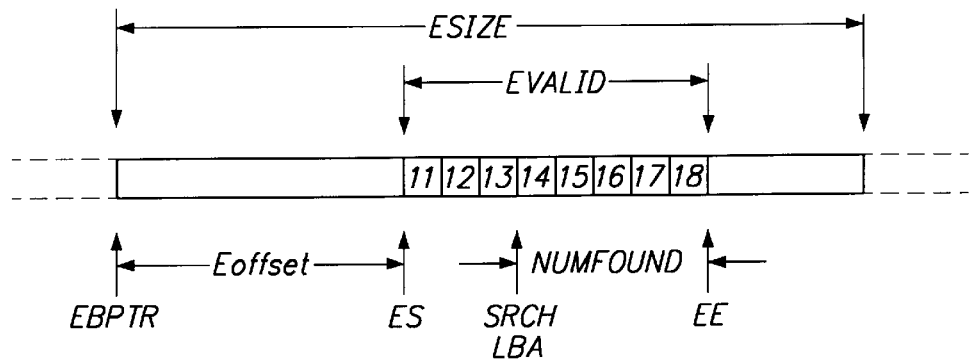
FIGS. 20A, 20B and 20C provide several cache read transfer process examples further illustrating the FIG. 20 processing steps.
Figure 20B:
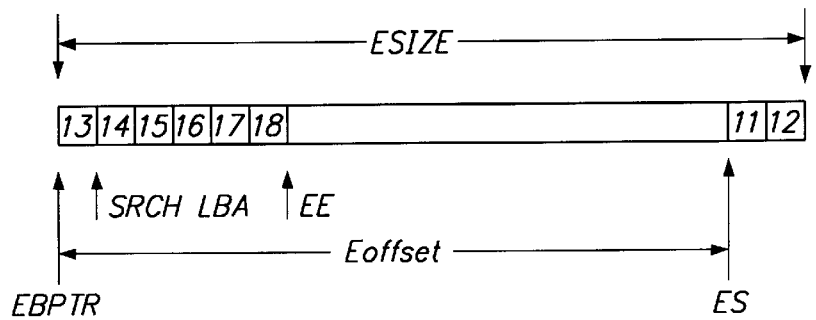

In the FIG. 19 transfer mode, the first hit state 621 is reached following state 648, and state 621 is then followed by five action states: ACT1 656, ACT2 658, ACT3 660, ACT4 662 and ACT5 664. These states represent progressive parallel data calculations and manipulations of the ALU 582 needed to calculate the starting address location value, a trigger count value (number of sectors available in a cache segment for transfer out before a next scan is required) and a segment rollover count value, and to load these values into the cache buffer interface block 586. The actual calculations and manipulations of the ALU 582 occurring for states 632, 646, 648, 621, 656, 658, 660, and 662 are set forth for each of the add, compare, negate and equivalence functions of the ALU in FIG. 20.

When operating in the FIG. 19 data transfer mode, the first scan (scan active process 614) has already been completed, and the initial cache scan result determines whether one or more sectors requested by the host are located within the cache. During data transfer, it is necessary to look again to locate the entries which have been previously found.

The following definitions apply with reference to FIGS. 20, 20A, 20B, and 20C:

SRCH LBA: Search for LBA; this is the logical block address being sought among the valid entries of the cache table. In order to be a hit, ES≦SRCHLBA<EE. SRCH LBA is incremented by NUMFOUND once a hit is detected.

ES: Cache entry start, i.e., the LBA of the starting entry in the cache buffer.

EE: Entry end, i.e., the LBA+1 of the last entry, which is also equal to LBA Entry Start+number of valid sectors.

NUMFOUND: Number of LBAs found in an entry, which is also equal to EE—SRCHLBA.

EBPTR: This is the buffer pointer at the beginning of the cache entry.

ESIZE: This is the size in sectors or blocks of the cache entry.

EVALID: This is the number of valid consecutive sectors stored within a cache entry In the FIG. 20A example, assume that the transfer process is searching the particular cache entry for LBA 14. So, the transfer process will determine what buffer address holds sector 14. The process has an entry start (ES), which in the present example is sector 11. The process has a number of valid sectors (EVALID), which in this example is 8. The process also has the size in sectors or blocks of the cache entry (ESIZE), and knows the entry buffer pointer (EBPTR) marking the beginning of this particular cache entry. With these values available, the ALU 582 then determines the number of LBAs found in the entry, by subtracting the sought-after LBA of the first sector (SRCH LBA) from the cache entry end (EE). In the FIG. 20A example, the transfer process has located five sectors in this particular cache entry which are available for immediate transfer to the host (i.e. EE-SRCH LBA, or sectors 19–14).

In this case: NUMFOUND=5 (=how many sectors can be transferred before scanning for the next transfer) and this count equals Trigger Count. The buffer starting address in buffer address space (HBptr) in the FIG. 20A example is equal to the sought-after LBA (SRCH LBA) minus the entry starting address (ES) plus an offset (Eoffset) from the beginning of the cache segment (EBPTR) to the entry starting address (ES), or HBptr=(SRCH LBA−ES+Eoffset)+EBPTR.

With reference to FIG. 20, at HIT 1 (state 621), T1 (a temporary register) is loaded with SRCH−ES; at ACT1 (state 656), OFFSET is added to T1, and a temporary buffer T2 is set equal to−ESIZE. At ACT 3 (state 660) the starting LBA pointer in buffer address space HBptr is equal to T1 +EBPTR, which is the starting block entry address in cache buffer space. Therefore, with reference to FIG. 20, the ALU 582 is calculating this starting buffer address HBptr through the ACT 3 state 660.

There are two special cases that must be considered. One of the cases is considered in FIG. 20B. This case arises when the cache buffer 514 is divided into hard segments, raising the possibility of segment wrap around. Therefore, in the FIG. 20B example sector 14 is shown to be wrapped around within the buffer. Therefore, the transfer process has to check to see if a starting LBA buffer offset (SRCH LBA−ES+OFFSET) is greater than the entry size (ESIZE), then a rollover condition is detected, and the starting buffer address HBptr equals (SRCHLBA−ES+EOFFSET)+EBPTR−ESIZE. In this special case, at ACT 2 (state 658), −ESIZE is added to (ESIZE is subtracted from) the current value in T1 providing ESIZE is not greater than T1.

Figure 20C:
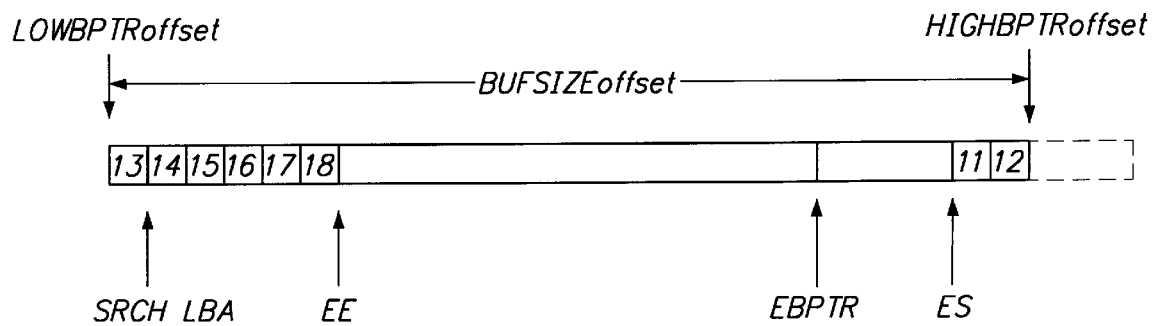

Another, more complicated special case is where the cache entry actually wraps around the end of the physical cache buffer space and continues at the beginning of the cache buffer space. This case is illustrated in FIG. 20C. In this special case, the transfer process must check to see whether the starting buffer address (HBptr) is higher than or equal to the high address of the cache buffer (Highbptr$_{offset}$). The high buffer pointer, low buffer pointer and buffer size values are registered and programmed and are available to the state machine. In order to make the check needed, the size of the cache buffer is checked by locating the high end address (Highbptr$_{offset}$). This condition is checked at ACT4 (state 662) where HBptr is checked to be less than Highbptr$_{offset}$. If the FIG. 20C condition is present, then (SRCHLBA−ES+Eoffset)+EBPTR<HIGHBPT$_{offset}$ is false, and the starting buffer address HBptr will be equal to SRCH LBA−ES+EOFFSET+EBPTR−BUFSIZE$_{offset}$.

If a first data sector transfer is to be made as determined at an ACT 5 state 664 of the FIG. 19 transfer mode process, a state 666 is reached which causes the number of sectors ready to be transferred to the host to be loaded, followed by a delay step 668 which waits for the host 5 to decide whether the number of sectors ready to send meets a minimum transfer requirement, after sectors ready to send has been loaded by the state machine 580 at state 666. If so, process flows to a transfer-waiting-to-complete state 670 which awaits completion of the transfer of sectors to the host 5. If not, a return is then made to the idle state 630 (FIG. 18) and the process returns to the scan active mode.

Reaching the ACT 5 state 664 during a subsequent transfer means that the transfer process has just completed finding the values of the next segment. During a segment transfer it is necessary to enter a transfer wait state to wait until the previous segment is fully transferred to the host. Accordingly, if the zero_trigger_count value is still true, the previous segment is still being transferred and process flow progresses to the Read_Transfer_Trigger_Count equals 0 (R×FTC0) state 672 which imposes a wait until the end of transfer of the previous segment, and then proceeds to the transfer_wait_count state 670. On a sector boundary a segment-to-segment jump state, a low-sectors-available (hlowcrs) state, or a transfer-done (hxferdone) state may be reached. When a cache-to-host transfer is complete, a cleanup routine is entered from state 670 which cleans up the states of the state machine 580 and ALU 582 and the scan idle state 630 is entered.

The cache controller state machine 580 monitors current progress of the automatic data sector transfer from a current buffer segment via a sector-decrement pulse provided by the host interface over a path 623. By remaining in data transfer mode, the cache state machine 580 is able automatically to jump from one buffer segment to another buffer segment in order for automatic transfer data sectors stored across multiple buffer segments. Cross-segment transfers are enabled when the cache controller state machine 580 causes the buffer manager 564 to roll over to a reload address of the next segment. Transfer is finished when the host asserts a transfer-complete status upon transfer of the last sector of the read request.

When the cache hit is partial, the host 5 will assert the low_sectors_available value at the beginning of the last transferable cached sector. Thereupon the cache controller state machine 580 rescans the cache list for the missed LBA. If the cache controller state machine 580 does not find the missed LBA, then the sectors_available value equals zero (or less than multiple) and this condition will stop the automatic data transfer to host.

During the first scan if a partial hit is detected, the cache state machine 580 alerts the drive firmware to fetch the missing data sectors, and if by the time of cache list rescan the drive firmware has added to or expanded a cache list entry, the cache state machine 580 will detect this fact during the rescan and will reload sectors_available in the buffer manager 564 and thereby continue the transfer to host. This process of monitoring, rescanning, and reloading will be continued by the cache manager 510 until the data transfer is completed.

Host Write Command

Figure 21:
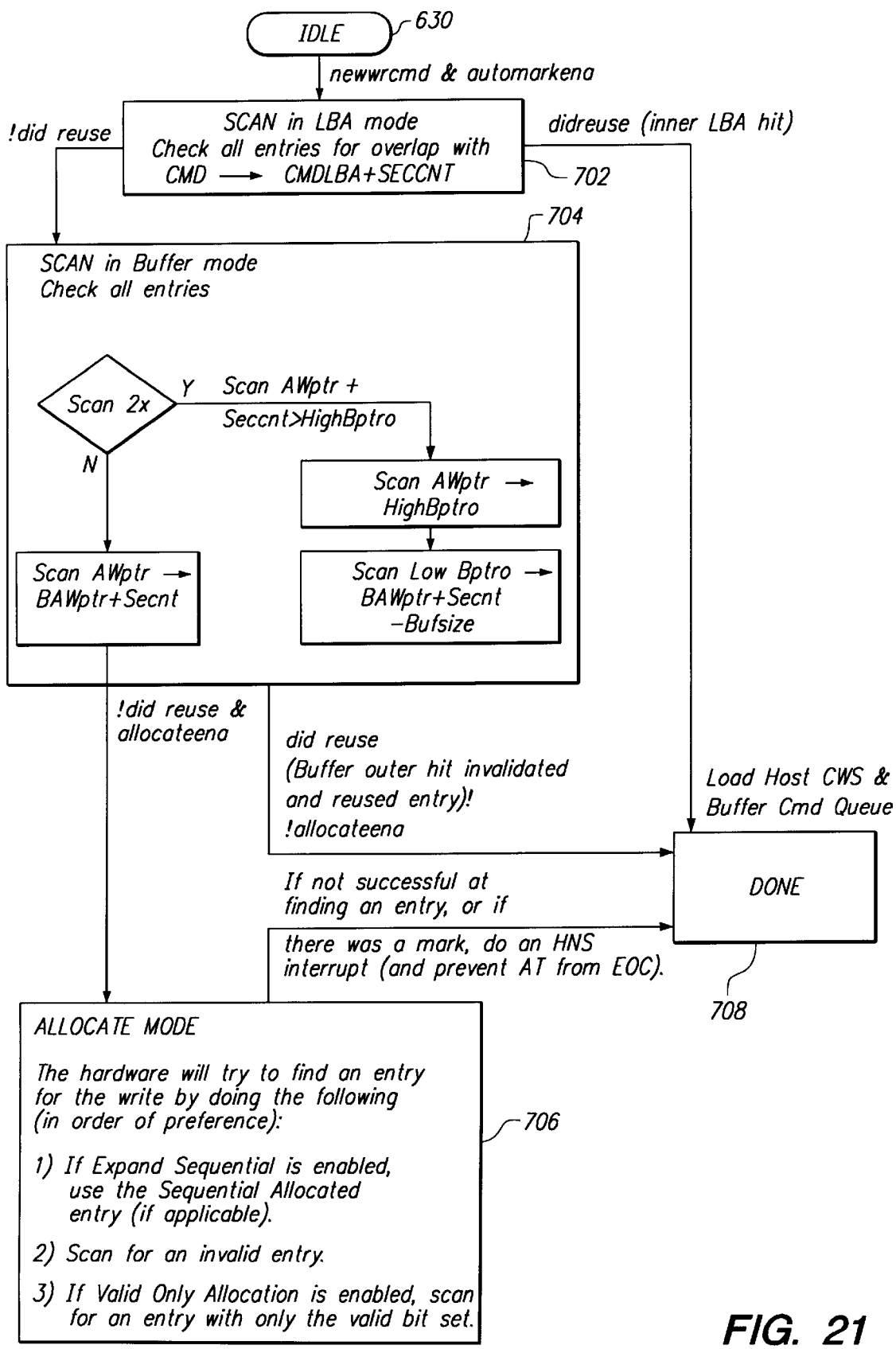
FIG. 21 is a state flow diagram of a cache write command scan flow process of the FIG. 15 cache controller state machine in handling host write commands.
Figure 22:
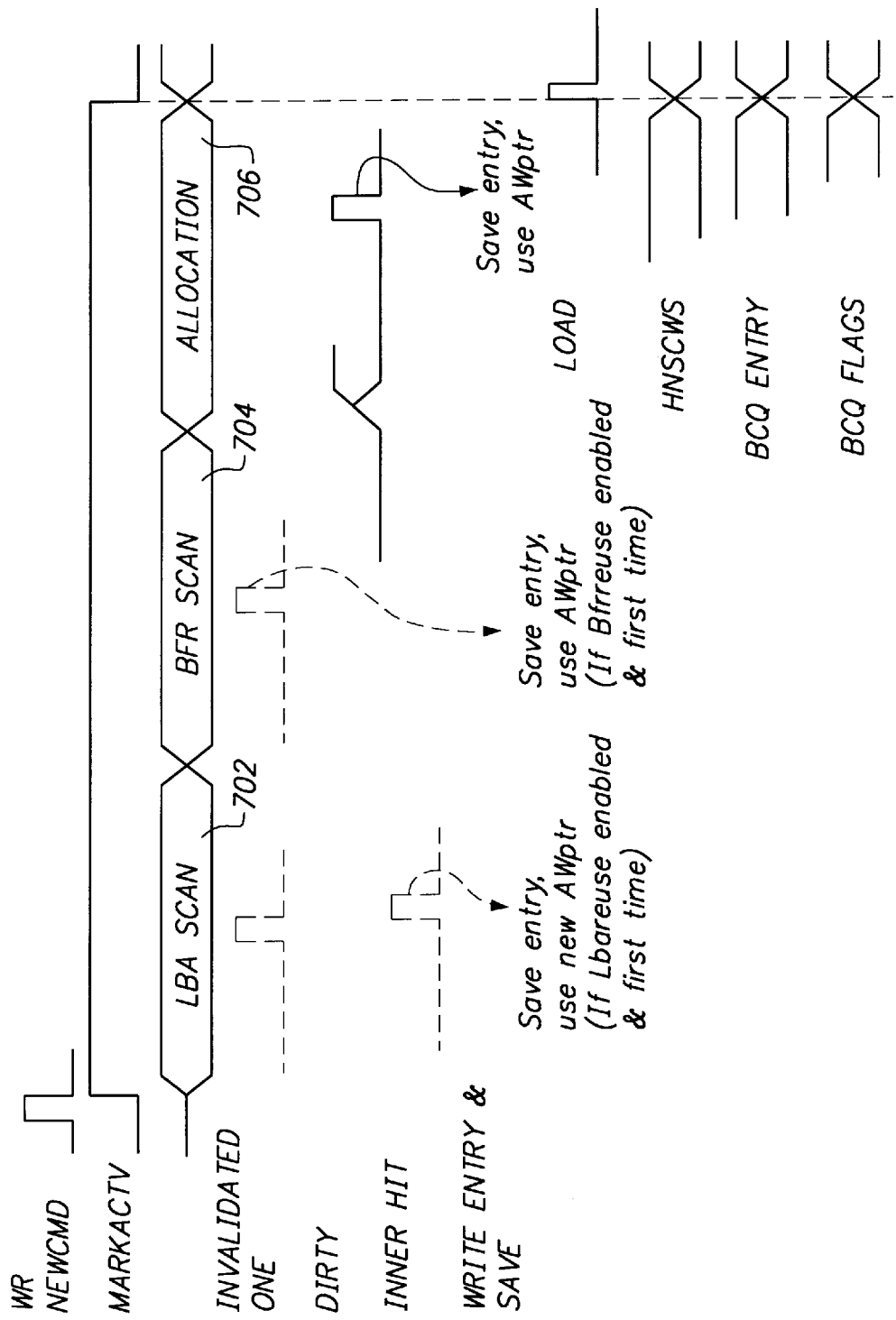
FIG. 22 is a series of timing diagrams illustrating write scan process timing of the FIG. 15 cache controller state machine in accordance with the FIG. 21 state flow diagram.

Turning now to FIG. 21, upon receiving a write command via the host interface 562, the cache manager 510 leaves the idle state 630 and begins to scan the cache table entries to locate any overlap between the data sectors to be written and the data sectors currently stored in the cache buffer 514 as represented by the cache list entries in cache RAM 584. This overlap can occur not only in LBA space but also in buffer space. As shown in FIG. 21, the cache write scans are performed by the cache controller state machine 580 sequentially on all cache list entries for an overlap. An LBA scan process 702 first scans all cache table entries for an overlap in LBA space by reference to the write command LBA value as compared to cache entry starting LBA and the sector count. If no reuse occurs as a result of the LBA scan process 702, a buffer space process 704 scans all entries for an overlap in the buffer space by use of a buffer autowrite pointer and the cache entry's buffer pointer and size.

If no cache entries are reused following the LBA scan mode 702 and the buffer scan mode 704, the state machine 580 enters an allocation process 706 which scans the cache list for an entry available for overwriting. A hierarchical approach is preferred. The process 706 first looks for a sequential allocated entry in the table, if enabled. Next, the process 706 looks for a first invalid entry. Finally, if an entry having valid bit only set is located, and valid-only allocation is enabled, a cache table entry having only its valid bit set will be allocated for writing.

During either the LBA scan mode 702 or the buffer scan mode 704, if a cache autotrim flag is set by firmware, the cache controller state machine 580 will automatically trim any overlap between a write segment and a corresponding cache entry segment. If, during either scan process 702 or 704 a cache table entry is reused, then the state machine 580 enters a done process 708 at which it will load sectors_available and buffer_Pointer registers which enable the host to begin the transfer to cache. The state machine 580 then returns to the idle state where it remains during the transfer from host unless there is not enough room in the cache buffer for the transfer and firmware intervenes. If, during either scan process 702 or 704, the state machine 580 cannot find any cache entry corresponding to the write entry based either on LBA space or buffer space, and if there is insufficient space allocated for overwriting, the state machine 580 leaves the allocate mode 706 and enters a done state 708 which causes a firmware interrupt. Firmware then takes over cache buffer management in order to carry out the current write command.

Figure 23:
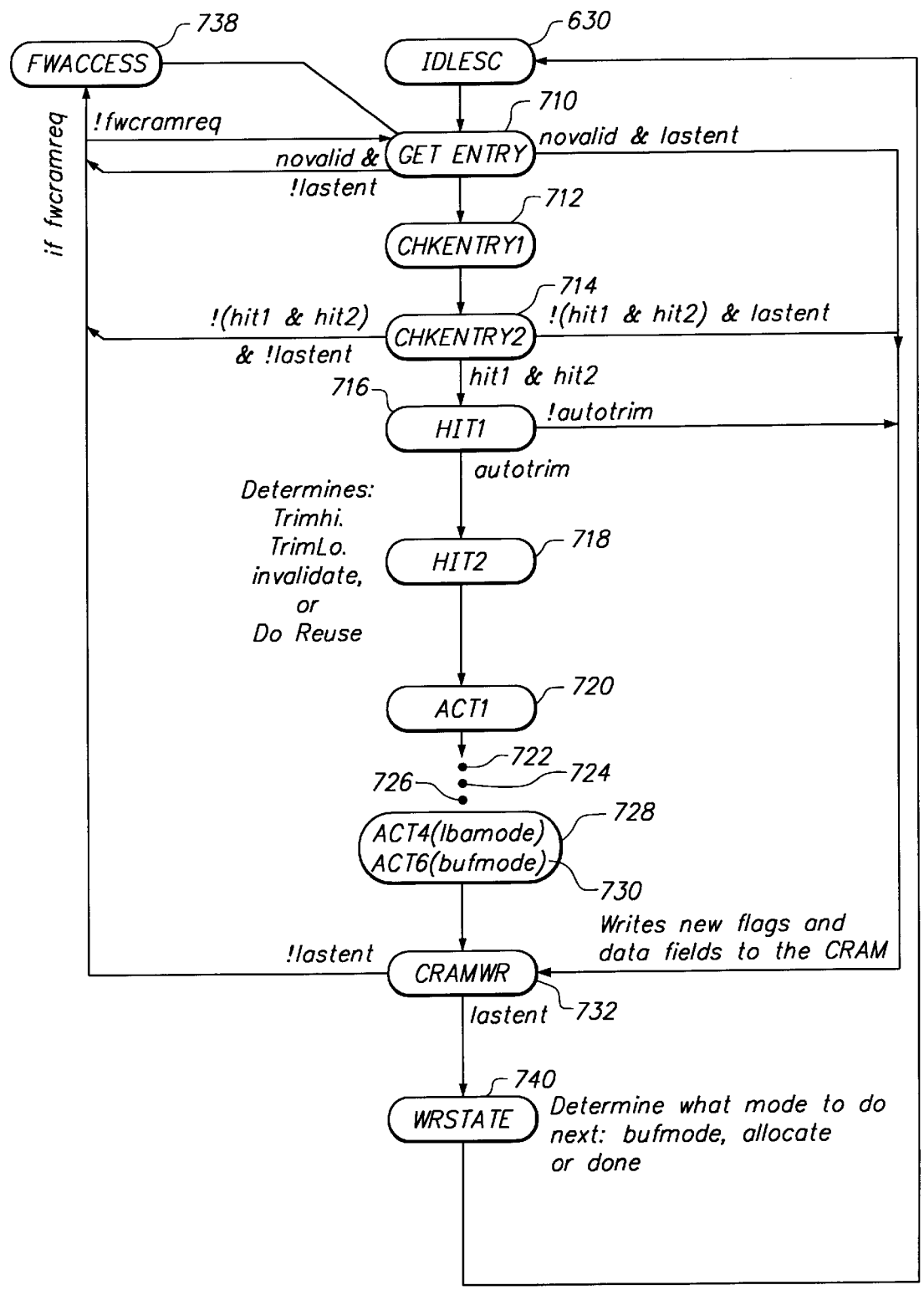
FIG. 23 is a state flow diagram of cache write scan of the FIG. 15 cache controller state machine carried out for write LBA scan and for write buffer scan modes of FIG. 21.

As shown in FIG. 23, the cache controller state machine 580 follows progressive states during both the LBA scan mode process 702 and the buffer scan mode process 704. During the LBA mode write scan process 702, after leaving idle state 630, the cache controller state machine 580 reaches a get entry state 710 which scans for cache list entries having a "valid" flag. If valid, the entry is checked at a state 712 and at a state 714 for overlap. If there is no overlap, the state machine 580 will return to state 710 and check the next entry (entry+1). Scan continues as firmware clears out the cache or otherwise allocates buffer space for storage of the blocks incoming from the host 5. If an overlap is detected at state 714, states 716 and 718 will determine what kind of overlap is present. If cache autotrim is enabled, HIT1 state 716 and HIT2 state 718 are reached which determine whether the cache trimming operation will be a trim-high, trim-low, invalidate or reuse cache trimming operation. Then follow four to six action states 720, 722, 724, 726, 728 and 730. Only the first four action states 720–726 are used for ALU operations during LBA scan mode 702 while all six action states 720-k730 are used for ALU operations during buffer scan mode. All of the possible write scan overlap conditions which can be found during the LBA and buffer scan processes 702 and 704 are graphed in FIG. 24. Via logic equation simplification techniques, the trimming operations for LBA scan mode can be reduced to the FIG. 25 trim-low, trim-high, no change and invalidate operations.

Figure 25:
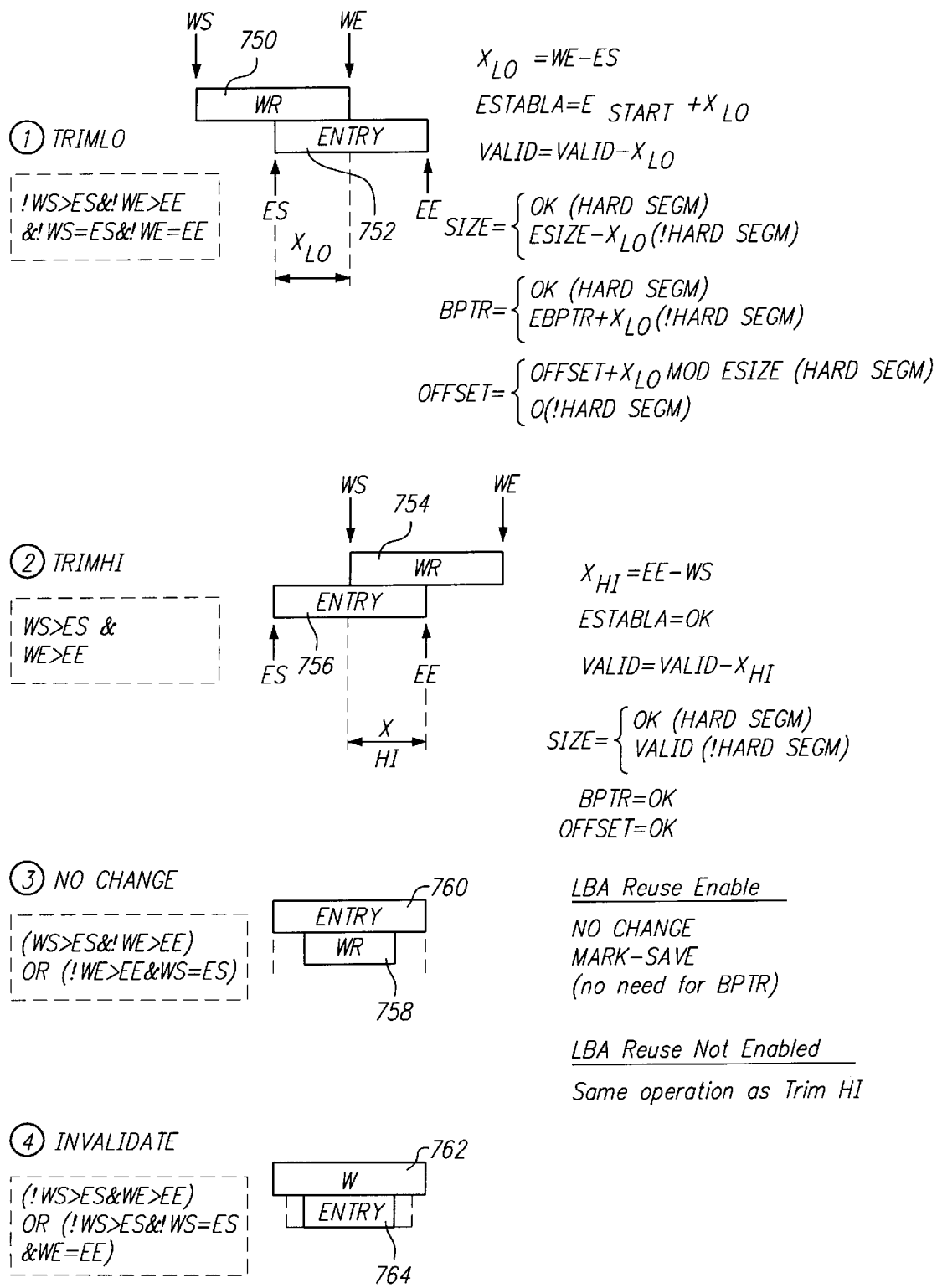
FIG. 25 shows four cache trim operations, one of which may be performed as a result of the LBA mode write scan process.

Cache trimming operations during data writing free up writing space in the cache buffer which would otherwise be occupied by partially valid data and which therefore could not be partially overwritten with newer, replacement data. LBA mode cache trimming operations performed during the cache controller state machine four action states 720–726 are explained in the FIG. 26 matrix table of ALU operations. FIG. 25 graphically explains the trim-low, trim-high, no change and invalidate cache write operations performed during the LBA cache scan process 702. If the write scan occurs during the buffer mode process 704, trimlow and trim-high operations are shown in FIG. 27A and 27B, respectively, and six action states 720–730 are required, as shown in the FIG. 28 ALU operation matrix table.

With reference to FIG. 25 TRIMLO, a write block sequence 750 from the host 5 has a starting address pointer (WS) and an ending address pointer (WE). An existing cache entry sequence 752 includes a starting address pointer (ES) and an ending address pointer (EE). In the trim-low (TRIMLO) example of FIG. 26, the write sequence 750 overlaps in part the cache sequence 752; however, the starting address WS of the write block sequence 750 is lower than the starting address ES of the cache sequence 752. Further, the ending address WE of the write sequence 750 is lower than the ending address EE of the cache sequence 752. An overlap area is designated $X_{LO}$, and it is the function of the cache controller state machine 580 automatically to overwrite the $X_{LO}$ overlap with so much of the write sequence 750 as overlaps with the cache entry sequence 752. The trim-low equations performed by the ALU unit 582 are shown to the right of the trim-low example of FIG. 25.

A trim-high (TRIMHI) example is also shown in FIG. 25. Therein, a cache sequence 756 has a starting address ES which is lower than a starting address WS of a write sequence 754. The cache sequence 756 also has an ending address EE which is lower than an ending address WE of the write sequence 754. In this case, an area of overlap between the entry 756 and the write sequence 754 is designated $X_{HI}$, and the trim-high equations performed by the ALU unit 582 are set forth to the right hand side of the trim-high example in FIG. 26.

A no-change or reuse example is also set forth in FIG. 25. In this example, a write sequence 758 lies entirely within a cache sequence 760, and the write sequence 758 may be written directly to the appropriate location of the cache buffer 514 without any cache trimming being required.

A cache sequence invalidation example is also set forth in FIG. 25. In this example, a write sequence 762 has a starting address before, and an ending address after, a cache sequence 764. In this case the cache controller state machine 580 marks the cache sequence 764 as invalid. This sequence 764 then is available to be overwritten with a portion of the write sequence 762 of the same size as the invalidated sequence 764.

LBA mode ALU process flow leading up to an action state 732 which carries out one of trim-low, trim-high, no change or invalidate is set forth in FIG. 26. Buffer mode ALU process flow leading up to an action state 732 which carries out one of trim-low, trim-high, or invalidate is set forth in FIG. 28.

As already mentioned, the cache list maintained in cache RAM 584 has e.g. 32 entries, for example as shown in FIG. 17. When a write command comes in from the host 5, the cache list is scanned. The valid bit of each flag field is checked. If an invalid or "dirty" entry (valid bit equals zero) is found, the cache controller state machine 580 uses the first available dirty entry for the write command as a default case.

If, following a first scan of the cache list, there are no dirty entries found in the cache list, then an "only-valid" condition is sought. An only-valid condition exists if the valid bit of an entry is the only flag bit set, and no other flag bits are set within the flag field of the entry. This condition means that cache data identified by this particular entry has already been written to disk, and there are no prefetch or other activity with regard to that particular entry. When a valid-only entry is found during cache list rescan, it is overwritten with the new write command.

If there are no dirty entries, and if there are no valid-only entries found after plural scans of the cache list, the cache controller state machine 580 interrupts the firmware at a state 738 and prevents the host from automatically ending the write command. Thereupon, the drive firmware will intercept and complete the write command.

In certain situations it may be possible to expand an existing cache entry rather than having to allocate a new entry. In a known approach a first write command specified a write segment having LBA 10 to LBA 15. Upon receipt of this first command, the cache controller state machine 580 scans the cache list. The first dirty cache entry of the cache table is found upon cache scan to be entry #5, and the first command is thereupon written to entry #5. When a second write command comes in, the cache controller state machine 580 again scans the cache list to look for a first available cache entry. Since cache entry #5 is now taken up with the first command, it is unavailable, and another entry must be found. In this known approach, every write command coming in occupies its own separate entry in the cache list.

Since data sequence writes are likely to be LBA-sequential, it becomes possible for a second command to add to or edit an existing cache list entry by expanding the number of sequential sectors specified in cache buffer, providing that the sector locations are also sequential in buffer address space. Returning to the example above, if cache list entry #5 initially specified LBA 10 to LBA 15, and the second command specified LBA 16 to LBA 20, it is possible to modify cache list entry #5 now to specify a total write sequence of LBA 10 to LBA 20.

In carrying out its scan the cache controller state machine 580 can mark an entry, perform cache trimming or invalidating, or reuse a cache list entry. Once the cache controller state machine 580 has completed its write scan and cache trimming at states 733 or 735, depending on whether it is operating in LBA mode 702 or buffer mode 704, it will load the sectors_available and buffer_pointer values in the buffer manager 564 at state 732 in order to enable the host 5 to begin automatic transfer of sectors to the cache buffer 514 without firmware intervention. The cache manager state machine 580 then returns to its idle state 630 and remains idle during the write transfer unless insufficient space exists in the cache buffer 514 and the drive firmware intervenes.

As explained during host write sequences the cache controller state machine 580 may also create cache list entries, set appropriate flags of a particular cache entry, and interrupt the drive firmware. Since a buffer write queue is used, the cache controller 510 will also load the entry/autowrite registers and flags to enable the host 5 to write to the queue of write commands contained in the cache list.

The present invention therefore provides efficient and quick scan of the cache list to find every data block requested and transfer the data if necessary. It saves the drive firmware from the labor intensive task of searching for data, which otherwise impairs performance of a cache manager. In the above preferred implementations, the cache list can be stored in fast local memory and searched quickly by the logic circuit or the cache controller state machine 580 (second preferred embodiment). Further, given a starting data block or LBA, unlike existing systems, the present invention searches to find data blocks beyond the requested data blocks. As a result, after a cache scan, the cache manager can be provided with cache status based on the requested set, including a miss, partial hit, full hit, and the first missing data block which needs to be read into the cache buffer from the disk drive. In the mean-time all available data blocks in the cache buffer can be transferred to the host. As such, the present invention takes advantage of locality of reference or sequential access by the host.

The transfer operation provides the ability to perform real-time data gathering of discontinuous pieces of data in the cache buffer, and to seamlessly provide the host with a single stream of data. This is because a cache scan provides information about what data is in the cache and where it is. Therefore, the data can be transferred without spending time between successive searches to find the next piece of data to transfer to the host.

The present invention also provides buffering of data from the host. Multiple write commands from the host are "stacked" until the cache manager decides to write the buffered data to disk. This allows the cache manager to operate without interruption by every write command. The above implementation provides stacking of 8 write commands into the FIFO. Since subsequent writes can overlap one another, the present invention provides marking and trimming capabilities to resolve overlaps as described above. As such, all overlaps can be resolved in real-time, keeping the Cache List coherent, and allowing for subsequent auto-read hits.

The present invention can be used with different cache managers utilizing replacement strategies such as: hardware or logical segmentation, LFU, LRU, localities or single thread mode. The present invention can also be used directly as a hardware accelerator by the cache manager for its scan and trimming functions described above.

Although the present invention has been described in considerable detail with regard to the preferred versions thereof, other versions are possible. It will be understood by those skilled in the art that various changes in form and detail can be made therein without departing from the spirit and scope of the invention as defined by the appended claims. Other means, comprising memory devices, processors, logic circuits, and/or analog circuits, for performing the above steps are possible and contemplated by the present invention. Additionally, the cache buffer management method according to principles of the present invention can be implemented for other interfaces, such as, for example, a SCSI interface, an IEEE-1394 interface, or a Fibre-channel interface. The disclosures and the descriptions herein are purely illustrative and are not intended to be in any sense limiting.

What is claimed is:

1. In a cache system comprising a cache buffer including a plurality of cache segments, each cache segment organized into a plurality of data block locations for storing data, and a cache manager for storing data into and retrieving data from said segments, a method of managing data transfer into and out of the segments, comprising the steps of:
    (a) maintaining a cache list comprising a plurality of entries each including information identifying: (1) a corresponding cache segment, and (2) a set of consecutive data blocks stored in the cache segment; and
    (b) in response to a request for transfer of a consecutive set of one or more data blocks out of the cache buffer, the requested set including a starting data block, performing steps including:
        (1) traversing the cache list to locate entries identifying the starting data block from among any of the data blocks stored in the cache segment, and consecutive data blocks successively following the starting data block without interruption, identifying as a missing data block the first data block in said succession, including said starting data block, not identified in any entry; and
        (2) providing cache information including:
            (i) cache hit status comprising: (1) a full hit if the missing data block is not in the requested set; (2) a miss if the missing data block is the starting data block in the requested set; or (3) a partial hit otherwise; and
            (ii) identity of said missing data block in case of a full or a partial hit;
wherein, said cache status information can be used by the cache manager to transfer data out of the cache buffer.

2. The method of claim 1, wherein step (b)(1) includes traversing the cache list to locate entries identifying the starting data block, and consecutive data blocks successively following the starting data block up to, and including, the last data block of the requested set.

3. The method of claim 2, wherein step (b)(1) further includes: after locating an entry identifying a data block next in sequence to the last data block of the requested set, transferring the requested set of data blocks out of the cache segments.

4. The method of claim 3, wherein the step of transferring includes:
    (a) denoting the starting data block as a running data block;
    (b) traversing the cache list to locate the entry identifying the running data block;
    (c) accessing the data segment corresponding to the located entry;
    (d) transferring as many of data blocks therein within the range of the requested set; and
    (e) if the sequence of the last data block of the requested set succeeds that of the last data block of the set identified in the located entry, denoting as the running block, the block next in sequence to said last block of the identified set, and repeating steps (b)–(d).

5. The method of claim 2, wherein step (b) further includes: after locating a missing data block, transferring out of the cache segments all consecutive data blocks from the starting data block up to the missing data block.

6. The method of claim 5, wherein the step of transferring includes:
    (a) denoting the starting data block as a running data block;
    (b) traversing the cache list to locate the entry identifying the running data block;
    (c) accessing the data segment corresponding to the located entry;
    (d) transferring as many of data blocks therein within the range of the requested set; and
    (e) if the sequence of the missing data block succeeds that of the last data block of the set identified in the located entry by at least two, denoting as the running block, the block next in sequence to said last block of the identified set, and repeating steps (b)–(d).

7. In a cache system comprising a cache buffer including a plurality of cache segments, each cache segment organized into a plurality of data blocks for storing data, and a cache manager for storing data into and retrieving data from said segments, a method of managing data transfer into and out of the segments, comprising the steps of:
    (a) maintaining a cache list comprising a plurality of entries each including information identifying: (1) a corresponding cache segment, and (2) a set of consecutive data blocks stored in the cache segment; and
    (b) in response to a request for transfer of a consecutive set of one or more data blocks into the cache buffer, the requested set including a starting data block, performing steps including:
        (1) traversing the cache list to locate all entries identifying sets of data blocks overlapping the requested set; and
        (2) providing cache hit status including: (i) a full hit if a located entry identifies a set of data blocks fully overlapping the requested set, (ii) a miss if no entry is located, and (iii) a partial hit otherwise;
wherein, said cache hit status can be used by the cache manager to transfer data into the cache buffer.

8. The method of claim 7, wherein step (b) further includes: (i) transferring the requested set of data blocks into a predesignated buffer, and (ii) marking each located entry as invalid.

9. The method of claim 8, wherein step (b) further includes locating an entry marked invalid, and updating the information in the invalid entry to identify: (i) the predesignated buffer as a corresponding data segment, and (ii) the requested set as the set of data blocks stored in the corresponding data segment.

10. The method of claim 7, wherein step (b) further includes: (i) transferring the requested set of data blocks into a predesignated buffer, and (ii) updating the information in each located entry to identify sets of data blocks which do not overlap the requested set.

11. The method of claim 7, wherein:
  (i) each cache list entry includes the address and size of the corresponding data segment in the buffer; and
  (ii) step (b) further includes transferring the requested set of data blocks into a predesignated section of the buffer having an address and a size, and updating the segment size in each located entry to resolve overlaps.

12. The method of claim 7, wherein step (b) further includes: (i) locating an entry identifying said starting data block, and determining if the sequence of the last data block of the set identified in the entry, matches or succeeds that of the last data block of the requested set, and (ii) if so, transferring the requested set of data blocks into corresponding data blocks in the segment identified in the entry.

13. In a cache system comprising a cache buffer including a plurality of cache segments, each cache segment organized into a plurality of data blocks for storing data, and a cache manager for storing data into and retrieving data from said segments, a method of managing data transfer into and out of the segments, comprising the steps of:
  (a) maintaining a cache list comprising a plurality of entries each including information identifying: (1) a corresponding cache segment, (2) a set of consecutive data blocks stored in the cache segment, and (3) entry validity;
  (b) in response to a request for transfer of a consecutive set of one or more data blocks out of the cache buffer, the requested set including a starting data block, performing steps including:
    (1) traversing the cache list to locate valid entries identifying the starting data block, and consecutive data blocks successively following the starting data block without interruption, identifying as a missing data block the first data block in said succession, including said starting data block, not identified in any entry; and
    (2) providing cache information including:
      (i) cache hit status comprising: (1) a full hit if the missing data block is not in the requested set; (2) a miss if the missing data block is the starting data block in the requested set; or (3) a partial hit otherwise; and
      (ii) identity of said missing data block in case of a full or a partial hit; and
  (c) in response to a request for transfer of a consecutive set of one or more data blocks into the cache buffer, the requested set including a starting data block, performing steps including:
    (1) traversing the cache list to locate all entries identifying sets of data blocks overlapping the requested set; and
    (2) providing cache hit status including: (i) a full hit if a located entry identifies a set of data blocks fully overlapping the requested set, (ii) a miss if no entry is located, and (iii) a partial hit otherwise;
wherein, said cache status information can be used by the cache manager to transfer data into and out of the cache buffer.

14. The method of claim 13, wherein step (b)(1) includes traversing the cache list to locate valid entries identifying the starting data block, and consecutive data blocks successively following the starting data block up to, and including, the last data block of the requested set.

15. The method of claim 14, wherein step (b)(1) further includes: after locating an entry identifying a data block next in sequence to the last data block of the requested set, transferring the requested set of data blocks out of the cache segments.

16. The method of claim 15, wherein the step of transferring includes:
  (a) denoting the starting data block as a running data block;
  (b) traversing the cache list to locate the valid entry identifying the running data block;
  (c) accessing the data segment corresponding to the located entry;
  (d) transferring as many of data blocks therein within the range of the requested set; and
  (e) if the sequence of the last data block of the requested set succeeds that of the last data block of the set identified in the located entry, denoting as the running block, the block next in sequence to said last block of the identified set, and repeating steps (b)–(d).

17. The method of claim 14, wherein step (b) further includes: after locating a missing data block, transferring out of the cache segments all consecutive data blocks from the starting data block up to the missing data block.

18. The method of claim 17, wherein the step of transferring includes:
  (a) denoting the starting data block as a running data block;
  (b) traversing the cache list to locate the valid entry identifying the running data block;
  (c) accessing the data segment corresponding to the located entry;
  (d) transferring as many of data blocks therein within the range of the requested set; and
  (e) if the sequence of the missing data block succeeds that of the last data block of the set identified in the located entry by at least two, denoting as the running block, the block next in sequence to said last block of the identified set, and repeating steps (b)–(d).

19. The method of claim 13, wherein step (c) further includes: (i) transferring the requested set of data blocks into a predesignated buffer, and (ii) marking each located entry as invalid.

20. The method of claim 19, wherein step (c) further includes locating an entry marked invalid, and updating the information in the invalid entry to identify: (i) the predesignated buffer as a corresponding data segment, and (ii) the requested set as the set of data blocks stored in the corresponding data segment.

21. The method of claim 13, wherein step (c) further includes: (i) transferring the requested set of data blocks into a predesignated buffer, and (ii) updating the information in each located entry to identify sets of data blocks which do not overlap the requested set.

22. The method of claim 13, wherein:
  (i) each cache list entry includes the address and size of the corresponding data segment in the buffer; and
  (ii) step (c) further includes transferring the requested set of data blocks into a predesignated section of the buffer having an address and a size, and updating the segment size in each located entry to resolve overlaps.

23. The method of claim 13, wherein step (c) further includes: (i) locating an entry identifying said starting data block, and determining if the sequence of the last data block of the set identified in the entry, matches or succeeds that of the last data block of the requested set, and (ii) if so, transferring the requested set of data blocks into corresponding data blocks in the segment identified in the entry.

24. A controller for managing data transfer into and out of a cache buffer including a plurality of cache segments, each cache segment organized into a plurality of data blocks for storing data, the controller comprising:
(a) a cache list comprising a plurality of entries each including information identifying: (1) a corresponding cache segment, and (2) a set of consecutive data blocks stored in the cache segment; and
(b) a logic circuit which automatically operates such that in response to a request for transfer of a consecutive set of one or more data blocks out of the cache buffer, the requested set including a starting data block, the logic circuit performs steps including:
(1) traversing the cache list to locate entries identifying the starting data block, and consecutive data blocks successively following the starting data block without interruption, identifying as a missing data block the first data block in said succession, including said starting data block, not identified in any entry;
(2) providing cache information including:
(i) cache hit status comprising: (1) a full hit if the missing data block is not in the requested set; (2) a miss if the missing data block is the starting data block in the requested set; or (3) a partial hit otherwise; and
(ii) identity of said missing data block in case of a full or a partial hit;
wherein, said cache status information can be used by the cache manager to transfer data out of the cache buffer.

25. The controller of claim 24, wherein the logic circuit for traversing the cache list further include means for traversing the cache list to locate entries identifying the starting data block, and consecutive data blocks successively following the starting data block up to, and including, the last data block of the requested set.

26. The controller of claim 25 wherein the logic circuit for traversing the cache list, further includes means for performing the steps of: after locating an entry identifying a data block next in sequence to the last data block of the requested set, transferring the requested set of data blocks out of the cache segments.

27. The controller of claim 26 wherein the logic circuit for transferring data includes means for:
(a) denoting the starting data block as a running data block;
(b) traversing the cache list to locate the entry identifying the running data block;
(c) accessing the data segment corresponding to the located entry;
(d) transferring as many of data blocks therein within the range of the requested set; and
(e) if the sequence of the last data block of the requested set succeeds that of the last data block of the set identified in the located entry, denoting as the running block, the block next in sequence to said last block of the identified set, and repeating steps (b)–(d).

28. The controller of claim 25 wherein the logic circuit for traversing the cache list further includes means for performing steps of: after locating a missing data block, automatically transferring out of the cache segments all consecutive data blocks from the starting data block up to the missing data block.

29. The controller of claim 28, wherein the logic circuit for transferring data includes means for performing the steps of:
(a) denoting the starting data block as a running data block;
(b) traversing the cache list to locate the entry identifying the running data block;
(c) accessing the data segment corresponding to the located entry;
(d) transferring as many of data blocks therein within the range of the requested set; and
(e) if the sequence of the missing data block succeeds that of the last data block of the identified in the located entry by at least two, denoting as the running block, the block next in sequence to said last block of the identified set, and repeating steps (b)–(d).

30. A controller for managing data transfer into and out of a cache buffer including a plurality of cache segments, each cache segment organized into a plurality of data blocks for storing data, the controller comprising:
(a) a cache list comprising a plurality of entries each including information identifying: (1) a corresponding cache segment, and (2) a set of consecutive data blocks stored in the cache segment;
(b) a logic circuit which automatically operates such that in response to a request for transfer of a consecutive set of one or more data blocks into the cache buffer, the requested set including a starting data block, the logic circuit performs steps including:
(1) traversing the cache list to locate all entries identifying sets of data blocks overlapping the requested set; and
(2) providing cache hit status including: (i) a full hit if a located entry identifies a set of data blocks fully overlapping the requested set, (ii) a miss if no entry is located, and (iii) a partial hit otherwise;
wherein, said cache hit status can be used by the cache manager to transfer data into the cache buffer.

31. The controller of claim 30, wherein the logic circuit for traversing the cache list the further includes means for performing the steps of: (i) transferring the requested set of data blocks into a predesignated buffer, and (ii) marking each located entry as invalid.

32. The controller of claim 31, wherein the logic circuit for traversing the cache list further includes means for locating an entry marked invalid, and updating the information in the invalid entry to identify: (i) the predesignated buffer as a corresponding data segment, and (ii) the requested set as the set of data blocks stored in the corresponding data segment.

33. The controller of claim 30, wherein the logic circuit for traversing the cache list further includes means for: (i) transferring the requested set of data blocks into a predesignated buffer, and (ii) updating the information in each located entry to identify sets of data blocks which do not overlap the requested set.

34. The controller of claim 30, wherein:
(i) each cache list entry includes the address and size of the corresponding data segment in the buffer; and
(ii) the logic circuit for traversing the cache list further includes means for transferring the requested set of data blocks into a predesignated section of the buffer having an address and a size, and updating the segment size in each located entry to resolve overlaps.

35. The controller of claim 30, wherein the logic circuit for traversing the cache list further includes means for: (i) locating an entry identifying said starting data block, and determining if the sequence of the last data block of the set identified in the entry, matches or succeeds that of the last data block of the requested set, and (ii) if so, transferring the requested set of data blocks into corresponding data blocks in the segment identified in the entry.

36. A controller for managing data transfer into and out of a cache buffer including a plurality of cache segments, each cache segment organized into a plurality of data blocks for storing data, the controller comprising:
(a) a cache list comprising a plurality of entries each including information identifying: (1) a corresponding cache segment, (2) a set of consecutive data blocks stored in the cache segment, and (3) entry validity; and
(b) a logic circuit automatically operating such that:
  (1) in response to a request for transfer of a consecutive set of one or more data blocks out of the cache buffer, the requested set including a starting data block, the controller performs steps including:
    (i) traversing the cache list to locate valid entries identifying the starting data block, and consecutive data blocks successively following the starting data block without interruption, identifying as a missing data block the first data block in said succession, including said starting data block, not identified in any entry;
    (ii) providing cache information including:
      (1) cache hit status comprising: a full hit if the missing data block is not in the requested set; a miss if the missing data block is the starting data block in the requested set; or a partial hit otherwise; and
      (2) identity of said missing data block in case of a full or a partial hit;
  (2) in response to a request for transfer of a consecutive new set of one or more data blocks into the cache buffer, the requested set including a starting data block, the controller performs steps including:
    (i) traversing the cache list to locate all valid entries identifying sets of data blocks overlapping the new set; and
    (ii) providing cache hit status including: a full hit if a located entry identifies a set of data blocks fully overlapping the new set; a miss if no entry is located; and a partial hit otherwise;
wherein, said cache hit status can be used by the cache manager to transfer data into and out of the cache buffer.

37. The controller of claim 36, wherein the logic circuit for traversing the cache list in response to the command to transfer data out, further includes means for traversing the cache list to locate valid entries identifying the starting data block, and consecutive data blocks successively following the starting data block up to, and including, the last data block of the requested set.

38. The controller of claim 37, wherein the logic circuit for traversing the cache list in response to the command to transfer data out, further includes means for performing the steps of: after locating an entry identifying a data block next in sequence to the last data block of the requested set, transferring the requested set of data blocks out of the cache segments.

39. The controller of claim 38, wherein the logic circuit for transferring data out includes means for:
(a) denoting the starting data block as a running data block;
(b) traversing the cache list to locate the valid entry identifying the running data block;
(c) accessing the data segment corresponding to the located entry;
(d) transferring as many of data blocks therein within the range of the requested set; and
(e) if the sequence of the last data block of the requested set succeeds that of the last data block of the set identified in the located entry, denoting as the running block, the block next in sequence to said last block of the identified set, and repeating steps (b)–(d).

40. The controller of claim 37, wherein the logic circuit for traversing the cache list in response to the command to transfer data out, further includes means for performing steps of: after locating a missing data block, transferring out of the cache segments all consecutive data blocks from the starting data block up to the missing data block.

41. The controller of claim 40, wherein the logic circuit for transferring data includes means for performing the steps of:
(a) denoting the starting data block as a running data block;
(b) traversing the cache list to locate the valid entry identifying the running data block;
(c) accessing the data segment corresponding to the located entry;
(d) transferring as many of data blocks therein within the range of the requested set; and
(e) if the sequence of the missing data block succeeds that of the last data block of the set identified in the located entry by at least two, denoting as the running block, the block next in sequence to said last block of the identified set, and repeating steps (b)–(d).

42. The controller of claim 36, wherein the logic circuit for traversing the cache list in response to the command to transfer data in, further includes means for performing the steps of: (i) transferring the requested set of data blocks into a predesignated buffer, and (ii) marking each located entry as invalid.

43. The controller of claim 42, wherein the logic circuit for traversing the cache list in response to the command to transfer data in, further includes means for locating an entry marked invalid, and updating the information in the invalid entry to identify: (i) the predesignated buffer as a corresponding data segment, (ii) the requested set as the set of data blocks stored in the corresponding data segment, and (iii) mark the entry as valid.

44. The controller of claim 37, wherein the logic circuit for traversing the cache list in response to the command to transfer data in, further includes means for: (i) transferring the requested set of data blocks into a predesignated buffer, and (ii) updating the information in each located entry to identify sets of data blocks which do not overlap the requested set.

45. The controller of claim 37, wherein:
(i) each cache list entry includes the address and size of the corresponding data segment in the buffer; and
(ii) the logic circuit for traversing the cache list in response to the command to transfer data in, further includes means for transferring the requested set of data blocks into a predesignated section of the buffer having an address and a size, and updating the segment size in each located entry to resolve overlaps.

46. The controller of claim 45, wherein the logic circuit for traversing the cache list in response to the command to transfer data in, further includes means for: (i) locating a valid entry identifying said starting data block, and determining if the sequence of the last data block of the set identified in the entry matches or succeeds that of the last data block of the requested set, and (ii) if so, transferring the requested set of data blocks into corresponding data blocks in the segment identified in the entry.

47. A cache manager of a peripheral data store for automatically managing data transfer between a host and a cache buffer of the storage device including a plurality of cache segments, each transfer between the host and the cache buffer being carried out without intervention of a programmed device microcontroller, each cache segment organized into a plurality of data blocks for storing data, the cache manager comprising:
  (a) a cache list memory array comprising a cache list of entries each including information identifying: (1) a corresponding cache segment, (2) a set of consecutive data blocks stored in the cache segment, and (3) entry validity; and
  (b) a cache controller state machine automatically operating such that:
    (1) in response to a request from the host for transfer of a consecutive set of one or more data blocks out of the cache buffer, the requested set including a starting data block, the cache controller state machine performing steps including:
      (i) traversing the cache list to locate valid entries identifying the starting data block, and consecutive data blocks successively following the starting data block without interruption, identifying as a missing data block a first data block in said succession, including said starting data block, not identified in any entry;
      (ii) providing cache information including:
        (1) cache hit status comprising: a full hit if the missing data block is not in the requested set; a miss if the missing data block is the starting data block in the requested set; or a partial hit otherwise; and
        (2) identity of said missing data block in case of a full or a partial hit;
    (2) in response to a request from the host for transfer of a consecutive new set of one or more data blocks into the cache buffer, the new set including a starting data block, the cache controller state machine performing steps including:
      (i) traversing the cache list to locate all valid entries locating identified sets of data blocks overlapping the new set; and
      (ii) providing cache hit status including: a full hit if a located entry corresponds to an identified set of data blocks fully overlapping the new set; a miss if no such entry is located; and a partial hit otherwise;
whereby said cache hit status can be used by the cache manager for automatic transfer of data into and out of the cache buffer in accordance with requests from the host.

48. The cache manager of claim 47 wherein the cache controller state machine includes logic means for automatically traversing the cache list to locate valid entries identifying the starting data block, and consecutive data blocks successively following the starting data block up to, and including, the last data block of the requested set.

49. The cache manager of claim 48 wherein the logic means for automatically traversing the cache list in response to a host command to transfer data out further includes automatic transfer means for performing the steps of: after locating an entry identifying a data block next in sequence to the last data block of the requested set, automatically transferring the requested set of data blocks out of the cache segments.

50. The cache manager of claim 49 wherein the automatic transfer means for transferring data out includes data block locating means for:
  (a) denoting the starting data block as a running data block;
  (b) traversing the cache list to locate the valid entry identifying the running data block;
  (c) accessing the data segment corresponding to the located entry;
  (d) automatically transferring as many of data blocks therein within the range of the requested set; and
  (e) if the sequence of the last data block of the requested set succeeds that of the last data block of the set identified in the located entry, denoting as the running block, the block next in sequence to said last block of the identified set, and repeating steps (b)–(d).

51. The cache manager of claim 48 wherein the logic means for traversing the cache list in response to the host command to transfer data out of the cache buffer to the host further includes automatic block transfer means, operative after locating a missing data block, for automatically transferring out of the cache segments all consecutive data blocks from the starting data block up to the missing data block.

52. The cache manager of claim 51, wherein the automatic block transfer means for transferring data includes block locating means for performing the steps of:
  (a) denoting the starting data block as a running data block;
  (b) traversing the cache list to locate the valid entry identifying the running data block;
  (c) accessing the data segment corresponding to the located entry;
  (d) automatically transferring as many of data blocks therein within the range of the requested set; and
  (e) if the sequence of the missing data block succeeds that of the last data block of the set identified in the located entry by at least two, denoting as the running block, the block next in sequence to said last block of the identified set, and repeating steps (b)–(d).

53. The cache manager of claim 47 wherein the cache controller state machine for traversing the cache list in response to the host command to transfer data in, further includes block transfer-in means for performing the steps of: (i) transferring a new set overlapping the identified set of data blocks into a predesignated buffer, and (ii) marking as invalid each entry of the identified set.

54. The cache manager of claim 53 wherein the block transfer-in means includes means for locating an entry marked invalid, and updating the information in the invalid entry to: (i) identify the predesignated buffer as a corresponding data segment, (ii) identify the new set as the set of data blocks stored in the corresponding data segment, and (iii) mark the entry corresponding to the new set as valid.

55. The cache manager of claim 47 wherein the cache controller state machine for traversing the cache list in response to the host command to transfer data in, further includes block transfer-in means for: (i) scanning the cache list to find sets of data blocks which fully or partially overlap the new set, (ii) trimming the cache list in order to free up writing space in the cache buffer which would otherwise be occupied by said sets of data blocks which fully or partially overlap the new set, and (iii) transferring the new set of data blocks into a space of the cache list which has been trimmed.

56. The cache manager of claim 55 wherein the block transfer-in means performs one of trim low, trim high, no change, and invalidate cache list trimming operations.

57. The cache manager of claim 56 wherein the block transfer-in means scans in logical block address mode for locating entrys having full or partial overlap with a logical block address of the new set.

58. The cache manager of claim 56 wherein the block transfer-in means scans in buffer mode for locating buffer space entries having full or partial overlap with a buffer space address of the new set.

59. The cache manager of claim 55 wherein the block transfer-in means performs cache buffer space allocation by one of (i) sequentially extending buffer space of an existing cache list entry to include the new set, (ii) allocating a marked invalid entry to the new set, and (iii) allocating a marked valid-only entry to the new set.

60. The cache manager of claim 47 wherein the cache controller state machine for traversing the cache list in response to the host command to transfer data in, further includes block transfer-in means for: (i) transferring the new set of data blocks into a predesignated buffer, and (ii) updating the information in each located entry to identify sets of data blocks which do not overlap the new set.

61. The cache manager of claim 60 wherein the block transfer-in means scans the cache entries for logical block address entry overlap, scans the cache entries for physical cache buffer address overlap, and allocates buffer space within existing cache table entries by one of (i) extending a block sequential entry, (ii) scanning for an invalid entry and overwriting an entry for the new set in place of the invalid entry, and (iii) scanning for a valid only entry having only a valid bit set in a flag field, and overwriting an entry for the new set in place of the valid only entry.

62. The cache manager of claim 47 wherein:
(i) each cache list entry includes the address and size of the corresponding data segment in the buffer; and
(ii) the cache controller state machine for automatically traversing the cache list in response to the command to transfer a new set of data blocks into the cache buffer further includes means for transferring the new set of data blocks into a predesignated section of the buffer having an address and a size, and updating the segment size in each identified entry of the cache list to resolve overlaps.

63. The cache manager of claim 62 wherein the cache controller state machine further includes means for: (i) locating a valid entry identifying said starting data block, and determining if the sequence of the last data block of the set identified in the entry matches or succeeds that of the last data block of the new set, and (ii) if so, transferring the new set of data blocks into corresponding data blocks in the segment identified in the entry.

64. The cache manager of claim 47 wherein the peripheral data store comprises a disk drive.

65. The cache manager of claim 64 being embedded within electronics of the disk drive and being directly connected to a disk drive interface circuit.

66. The cache manager of claim 65 wherein cache hit status automatically causes an embedded microcontroller of the disk drive automatically to transfer disk data blocks requested by the host from disk storage and update the cache list in response to a cache miss or partial cache hit so that such disk data blocks may be located automatically by the cache manager during a subsequent scan of the cache list.

67. The cache manager of claim 47 further comprising a dedicated arithmetic logic unit controlled by the cache controller state machine.

68. The cache manager of claim 67 wherein the dedicated arithmetic logic unit provides simultaneous add, compare, negate and test equal logic operations during a single clock cycle.

* * * * *